(12) United States Patent
Hare

(10) Patent No.: US 11,600,200 B2
(45) Date of Patent: Mar. 7, 2023

(54) MOULAGE TRAINING APPARATUS, INJURY SIMULANT, METHOD OF MAKING AND USING THE SAME

(71) Applicant: Advanced Trauma Training Systems LLC, Lake Havasu City, AZ (US)

(72) Inventor: Tyler Hare, Yermo, CA (US)

(*) Notice: Subject to any disclaimer, the term of this patent is extended or adjusted under 35 U.S.C. 154(b) by 354 days.

(21) Appl. No.: 16/503,917

(22) Filed: Jul. 5, 2019

(65) Prior Publication Data

US 2020/0013314 A1    Jan. 9, 2020

Related U.S. Application Data

(60) Provisional application No. 62/694,303, filed on Jul. 5, 2018.

(51) Int. Cl.
| | | |
|---|---|---|
| *G09B 23/28* | (2006.01) |
| *A41D 13/12* | (2006.01) |
| *G09B 23/30* | (2006.01) |
| *G09B 19/00* | (2006.01) |

(52) U.S. Cl.
CPC ........... *G09B 23/28* (2013.01); *A41D 13/129* (2013.01); *G09B 23/30* (2013.01); *G09B 23/303* (2013.01); *G09B 19/00* (2013.01)

(58) Field of Classification Search
None
See application file for complete search history.

(56) References Cited

U.S. PATENT DOCUMENTS

| | | |
|---|---|---|
| 2,752,697 A | 7/1956 | Lawall |
| 2,945,304 A | 7/1960 | Niiranen et al. |
| 3,027,655 A | 4/1962 | Alderson |
| 3,307,873 A | 3/1967 | Blaszkowski |
| 3,839,740 A | 10/1974 | Tornberg |
| 3,852,893 A | 12/1974 | Smrcka |
| 4,136,686 A | 1/1979 | Arluck |
| 4,182,054 A | 1/1980 | Wise et al. |
| 4,481,001 A | 11/1984 | Graham et al. |
| 4,596,528 A | 6/1986 | Lewis et al. |
| 5,054,127 A | 10/1991 | Zevchak |
| 5,742,939 A | 4/1998 | Williams |
| 5,775,916 A | 7/1998 | Cooper et al. |
| 7,454,798 B2 | 11/2008 | Feodoroff |
| 8,221,129 B2 | 7/2012 | Parry et al. |

(Continued)

FOREIGN PATENT DOCUMENTS

DE      202009004115     6/2009

OTHER PUBLICATIONS

International Search report and Written Opinion issued in International Application No. PCT/US2019/040701, dated Nov. 18, 2019, 16 pages.

(Continued)

*Primary Examiner* — James B Hull
(74) *Attorney, Agent, or Firm* — Messner Reeves LLP; Scott J. Hawranek

(57) ABSTRACT

The present invention generally relates to a medical training apparatus, injury simulant, method of making and using the same. More particularly, the present invention is directed towards a moulage training apparatus having one or more access panels, injury simulant, method of making and using the same in the field of emergent and non-emergent medical treatment and acute care simulation.

20 Claims, 29 Drawing Sheets

(56) References Cited

U.S. PATENT DOCUMENTS

| | | |
|---|---|---|
| 2003/0131401 A1 | 7/2003 | Dilworth, Jr. et al. |
| 2005/0166298 A1 | 8/2005 | Pieroranzio |
| 2005/0181342 A1 | 8/2005 | Toly |
| 2006/0277653 A1 | 12/2006 | Okajima |
| 2007/0245450 A1 | 10/2007 | Feodoroff |
| 2008/0083049 A1 | 4/2008 | McLeod |
| 2009/0011394 A1 | 1/2009 | Meglan et al. |
| 2009/0098521 A1 | 4/2009 | Kuo et al. |
| 2009/0298034 A1 | 12/2009 | Parry et al. |
| 2010/0299804 A1 | 12/2010 | Huang |
| 2011/0099682 A1 | 5/2011 | Early |
| 2012/0003621 A1* | 1/2012 | Segall .............. G09B 23/303 434/272 |
| 2012/0276511 A1 | 11/2012 | Parry et al. |
| 2013/0078604 A1 | 3/2013 | King |
| 2016/0021950 A1 | 1/2016 | Rafieiankopaei |
| 2017/0148077 A1* | 5/2017 | Phillips .............. A47F 5/0018 |

OTHER PUBLICATIONS

International Preliminary Report issued in Application No. PCT/US2019/040701, dated Jan. 14, 2021, 13 pages.

\* cited by examiner

1100

1102

1104

1106

1108

MOULAGE TRAINING APPARATUS, INJURY SIMULANT, METHOD OF MAKING AND USING THE SAME

The present application claims the benefits of and priority, under 35 U.S.C. § 119(e), to U.S. Provisional Application Ser. No. 62/694,303, filed Jul. 5, 2018, which is fully incorporated herein by reference.

BACKGROUND OF THE INVENTION

Field of the Invention

The present invention generally relates to a medical training apparatus, injury simulant, method of making and using the same. More particularly, the present invention is directed towards a moulage training apparatus having one or more access panels, injury simulant, method of making and using the same in the field of emergent and non-emergent medical treatment and acute care simulation.

Discussion of the Related Art

The related art is directed towards simulation devices used as a training resource when educating responders in providing medical care. These related art simulations are designed to replicate complications of the integumentary, muscular, skeletal, circulatory, nervous, lymphatic, respiratory, or digestive systems; expensive training aids can range from automated or inanimate manikins that may have fabricated cells, tissues and organs or operated through electronics or the use of role players. Most training is conducted using basic non-invasive training aids which may include that of a live role player that are acting as an injured victim with static injuries. However, the clothing used is typical clothing that does not allow for realistic scenarios and is not easy to use. A foundation of response training cannot be adequately learned through textbooks or lectures and requires hand on palpation of casualties, before stabilization and bandaging of injuries in an atmosphere closely resembling the environment they will be expected to perform in.

There is a need for moulage training apparatus and simulant injuries in the field of emergent and non-emergent medical treatment and acute care simulation.

SUMMARY OF THE INVENTION

Accordingly, the invention is directed to a moulage training apparatus, injury simulant and method of making and using the same that substantially obviates one or more of the problems due to limitations and disadvantages of the related art.

An advantage of the invention is to provide a system that allows for realistic medical training in field of emergent and non-emergent medical treatment and acute care simulation.

Another advantage of the invention is to provide an apparatus that can be used by many different size users in a timely manner.

Yet another advantage of the invention is to provide an apparatus that can be used for multiple different training scenarios and increases the speed of setting up the training scenario over the prior art given the ease of use.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a moulage training article of clothing for a user includes a body portion having one or more fabric materials configured to cover an upper torso and arms of the user when worn by the user, the one or more fabric materials including a neck portion, a shoulder portion, a torso portion extending from the shoulder portion to a waist of the user, a first arm portion extending from the shoulder portion, a second arm portion extending from the shoulder portion, a closable portion extending from the neck portion through the torso portion to the waist of the user, the closable portion being substantially centered on the front torso portion of the user and the closable portion including a closing mechanism associated with the closable portion to maintain the closable portion in an open or closed position. The moulage training apparatus further includes a first torso access panel attachment mechanism coupled to a torso portion of the fabric and a first torso access panel comprising an outside surface and an inside surface, the inside surface having a second torso access panel attachment mechanism coupled to the inside surface of the first torso access panel configured to be releasably attached to at least a portion of the first torso access panel attachment mechanism. The article may include other access panels and simulant injuries described herein.

In another aspect of the present invention, the moulage training article of clothing for a user includes a portion comprising one or more fabric materials configured to cover a waist portion and legs of the user when worn by the user, the one or more fabric materials including a waist portion extending to a crotch of the user, a first leg portion extending from the waist portion to an ankle of the user, a second leg portion extending from the waist portion to an ankle of the user, a closable portion extending from the waist portion through the waist portion to the crotch of the user, the closable portion being substantially centered on the front of the waist portion of the user and the closable portion including a closing mechanism associated with the closable portion to maintain the closable portion in an open or closed position. The article further includes a first leg access panel attachment mechanism coupled to a first leg portion of the fabric and a first leg access panel including an outside surface and an inside surface, the inside surface having a second leg access panel attachment mechanism configured to be releasably attached to at least a portion of the first leg access panel attachment mechanism.

To achieve these and other advantages and in accordance with the purpose of the present invention, as embodied and broadly described, a moulage training system for training aids emergent and non-emergent medical treatment and acute care simulation includes one or more injury simulants configured to mimic a wound of an injury of a user. The system also includes a moulage training uniform comprising an article of clothing having one or more expandable portions configured to adjust for different size users and one or more access panels releasably attached to the moulage training uniform configured to allow access to a surface of the moulage training uniform, wherein the surface of the moulage training uniform is configured to receive one or more injury simulants that can be releasably coupled to the surface of the moulage training uniform.

In yet another aspect of the present invention, a moulage training system for training aids emergent and non-emergent medical treatment and acute care simulation, the system includes one or more injury simulants configured to mimic a wound of an injury of a user. The system also includes a moulage training uniform comprising an article of clothing having one or more expandable portions configured to adjust for different size users and one or more access panels releasably attached to the moulage training uniform configured to allow access to a surface of the moulage training uniform, wherein the surface of the moulage training uniform is configured to receive one or more injury simulants that can be releasably coupled to the surface of the moulage training uniform.

In yet another aspect of the present invention, system for emergent and non-emergent medical treatment and acute care simulation includes an injury simulant having a first surface configured to mimic a wound of an injury of a user and a second surface having an injury simulant attachment mechanism. The system also includes a moulage training uniform comprising an article of clothing having one or more expandable portions configured to adjust for different size users and one or more access panels, wherein one of the one or more access panels is releasably attached with an access panel attachment mechanism to moulage training uniform attachment mechanism, and wherein when the one of the one or more access panels is removed or partially removed to allow access to one or more injury simulants attached to the moulage training uniform attachment mechanism is permitted.

In still another aspect of the present invention, a method of using a moulage training system for training a user on emergent and non-emergent medical treatment and acute care simulation. The method includes using any apparatus described herein, e.g., providing one or more injury simulants including a first surface and opposite second surface, wherein the first surface is configured to mimic a wound or injury of a user and the second surface comprising an injury attachment mechanism. The method includes proving a moulage training uniform comprising an article of clothing having one or more expandable portions configured to adjust for different size users and one or more access panels releasably attached to the moulage training uniform, adjusting to the one or more expanding portions to the user, arranging the moulage training uniform on the user and releasably attaching the one or more injury simulants with the injury attachment mechanism to the moulage training uniform under the one or more access panels.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
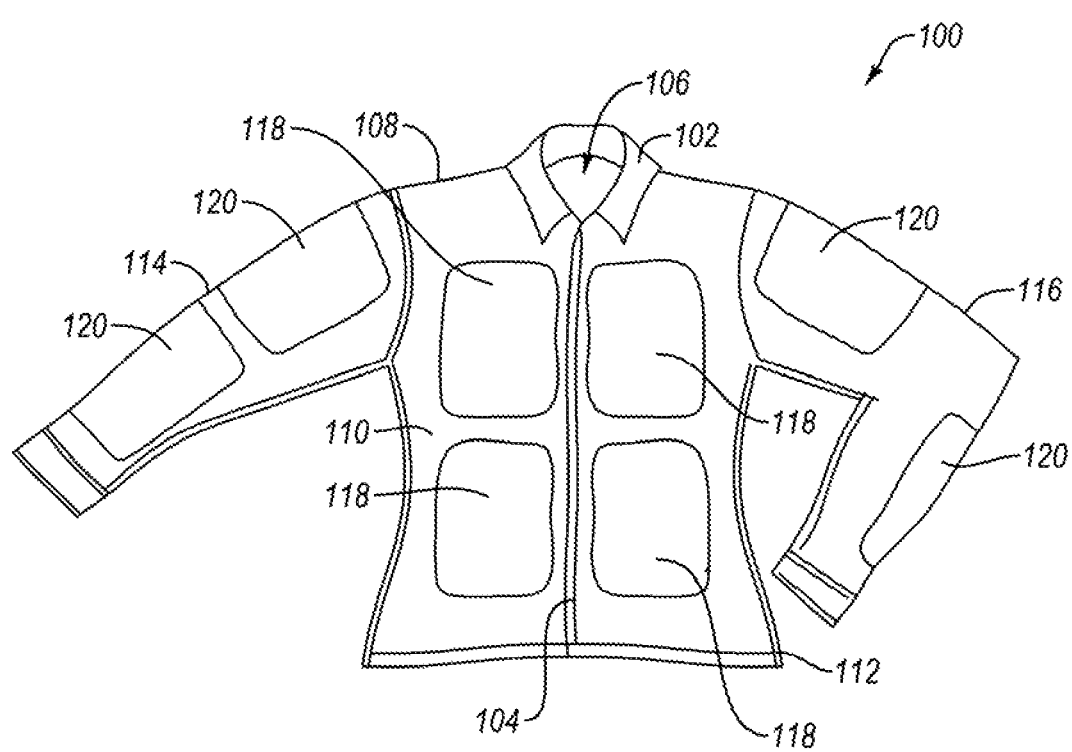
FIG. 1 illustrates a front view of a moulage training apparatus according to an embodiment of the invention in a first orientation.

The following detailed description describes a moulage training apparatus, moulage training system, simulant injuries and related methods of using the same which are presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

In order to more fully appreciate the present disclosure and to provide additional related features, each of the following references are fully incorporated therein by reference in their entireties:

(1) U.S. Pat. No. 3,027,655 issued to S. W. Alderson, disclosing, a portable manikin for first aid training and containing a variety of simulated wounds, some of grievous character, the manikin being independent of any base or supporting structure so that it can be operated in any body position and can be placed in a simulated accident scene. The manikin of the present invention is thus distinguished from all prior devices of this character which have been immovably mounted in one position only on a base. Also, in these earlier dummies the several injuries received their blood supply from a single pump, and if several injuries were being operated the blood would flow from each at the same rate, or it they were successively operated a new setting of the valve was required in order to simulate the actual flow from a particular type of injury. An open sump was used and hence the simulated blood had to be drained before it could be transported. The whole assembly was notably lacking in realistic operation and appearance and could obviously be used only for classroom work. It could not be used for field work where the students could unexpectedly discover a casualty.

(2) U.S. Pat. No. 3,839,740 issued to Tornberg disclosing, an expandable waist construction is disclosed herein for a garment such as a pant, trouser, skirt, or the like which includes a waistband having an elongated section joining the opposite ends of the band and a folded or cut portion joining the opposite edges of the main body of the garment such as the pant leg or skirt. In the case of a trouser or pant, the cut portion extends from the lower edge of the waistband immediately behind the pocket to a length extending to the bottom of the pocket. A selected end of the elongated section joining the opposite ends of the waistband is provided with a snap fastener so that the waist may be narrowed by selecting alignment of mating snaps and the waist may be expanded additionally by unfolding the tucked or folded portion so as to permit expansion of the upper part of the garment body.

(3) U.S. Pat. No. 7,454,798 issued to Feodoroff disclosing, a medical garment is configured to be worn by a patient requiring medical attention. The medical garment includes a blouse portion including fabric material configured to cover an upper torso and arms of the patient when worn. The medical garment further includes a body part access panel formed in the fabric material adjacent a body part of the patient when worn. The body part access panel is movable between a closed position in which the body part access panel is releasably secured to the fabric material and an open position in which the body part access panel is moved away from the fabric material to allow access to the body part of the patient. Other embodiments of the medical garment and a method of performing a medical examination on a patient are further disclosed.

(4) U.S. Pat. No. 8,221,129 issued to Parry et al, disclosing, a wearable wound simulant including a skin replica having the appearance of a particular region of the human body, examples including but not limited to a leg, arm, torso, or stomach, and a wound disposed along the skin replica is described. The skin replica includes a plurality of bendable layers arranged to replicate the visual and tactile properties of human tissues and at least one tear resistant layer comprised of a fabric material disposed between two bendable layers. The tear resistant layers are less stretchable than the bendable layers so as to prevent the bendable layers from stretching beyond their failure threshold. Design elements of the present invention facilitate the visual, tactile, and functional aspects of a battlefield wound so as to allow for the diagnosis of injuries associated therewith. Furthermore, the present invention allows for the insertion of a needle or the like, the probing and/or packing of wounds, the compression of vascular simulants to stop or limit blood loss, and the replacement of dislodged organs.

(5) U.S. Patent Application Publication No. 2003/0131401 issued to Dilworth, J R., et al., disclosing, a garment system for healthcare providers including pants, a shirt, and a hood that provides a protective barrier against fluid or airborne contaminates. The pants have drawstrings and loops at the waist and have at least one bellows pocket with cover flap and at least one utility loop for holding various items. The shirt has one pocket adapted to hold a writing utensil and incorporates a security badge attachment loop. Another pocket has a pull tab on the flap for easy access when the user is gloved. Removable insignia enable the user to remove personal identification information prior to laundering. The hood removably fastens to the shirt collar and has a clear or translucent face shield to permit viewing but be a fluid barrier, and, side openings to permit sound and air to pass into the hood. The shirt can be long or short sleeve, or convertible.

(6) U.S. Patent Application Publication No. 2005/0166298 issued to Picroranzio, et al., disclosing, a garment having expandable legs or sleeves. Various sized openings are provided in the legs or sleeves and are adjustably closable by a variety of means including elastic bands, lacing, and buttons.

(7) U.S. Patent Application Publication No. 2009/0298034 issued to Parry, et al., disclosing, a wearable wound simulant including a skin replica having the appearance of a particular region of the human body, examples including but not limited to a leg, arm, torso, or stomach, and a wound disposed along the skin replica is described. The skin replica includes a plurality of bendable layers arranged to replicate the visual and tactile properties of human tissues and at least one tear resistant layer comprised of a fabric material disposed between two bendable layers. The tear resistant layers are less stretchable than the bendable layers so as to prevent the bendable layers from stretching beyond their failure threshold. Design elements of the present invention facilitate the visual, tactile, and functional aspects of a battlefield wound so as to allow for the diagnosis of injuries associated therewith. Furthermore, the present invention allows for the insertion of a needle or the like, the probing and/or packing of wounds, the compression of vascular simulants to stop or limit blood loss, and the replacement of dislodged organs.

(9) U.S. Patent Application Publication No. 2010/0299804 issued to Huang, disclosing, an expandable clothing includes two cloth members, and an expandable element secured between the cloth members and having a resilience greater than that of the cloth members for allowing the clothing to be expanded to fit various users having different sizes or dimensions. The clothing may be selected from pants, trousers, skirts or shorts, sweaters, shirts, jackets or coats or the like having two tubular pant-legs or two sleeves for accommodating or receiving the legs or the feet, or the hands of the users. The expandable elements may be attached to the inner portions or the side portions of the pant-legs or the sleeves, or attached to the rear portion of the coat.

(10) U.S. Patent Application Publication No. 2012/0276511 issued to Parry, et al., disclosing a wearable wound simulant for simulating a battlefield wound is presented. The simulant facilitates a graphically and functionally realistic medical training tool. The simulant includes a skin replica and a wound. The skin replica is shaped to conformably contact and cover a body region either in part or whole. The skin replica further includes a plurality of bendable layers arranged to approximately replicate the visual and tactile properties of human tissue and at least one tear resistant layer composed of a fabric material disposed between two bendable layers. At least one tear resistant layer is less stretchable than the elastic limit of the bendable layers so as to prevent failure thereof. The bendable and tear resistant layers form a self-sealing structure. A three-dimensional wound structure is disposed along the skin replica so as to replicate the appearance and functionality of a penetrating or non-penetrating injury.

(11) U.S. Patent Application Publication No. 2013/0078604 issued to King, disclosing, a system for simulating one or more hemorrhages in order to provide a more dynamic and realistic hemorrhage simulation in order to train medical personnel and other critical care givers, such as first responders, medics, and emergency medical technicians (EMTs) on treating hemorrhages. The system includes a reservoir, a flow controller, and at least one conduit connected to at least one simulated wound site wherein the system supplies fluid to the simulated wound site in order to simulate a hemorrhage. The system may further include a plurality of wound sites that have their respective fluid flows controlled by the fluid flow controller. In at least one embodiment, the reservoir and the flow controller are housed within a bag. In at least one embodiment, the system further includes an audio system for providing audio cues to the simulation participants to enhance the realism of the simulation.

One embodiment is directed towards moulage training uniform without injury receptacle area but access to patient underneath for wearable or applied simulant injuries attached to skin.

One embodiment is directed towards a moulage training uniform that is configured to meet the increased demands of practical medical training in the field environment and configured to expand training options and realism while significantly reducing turn around times between scenario setups. The moulage training uniform includes a modular training garment and attachable simulant injuries, optionally and/or alternatively the simulant injuries can also be configured to be worn by a user. The moulage training uniform provides a more convenient method of training that incorporates an expandable modular clothing arrangement for users of different users, e.g., male and females of different sizes, e.g., weight and height. The moulage training uniform can include detachable trauma windows configured to access removable/reusable simulant injuries that can be attached to the user's outer attire, the moulage training uniform directly, a user's skin, e.g., wearable injury, combinations of the same or the like.

In one embodiment, various simulant injuries and sizes allow distribution across strategic areas around the user's body to design and develop complex medical training scenarios, increasing in both intensity and severity based on selection of modified trauma panels and moulage wounds.

In one embodiment, a system includes one or more simulant injuries and moulage uniform. The system is configured and a enhances instruction methods to healthcare providers working in the fields of medicine where education ranging from simple first aid to pre-hospital trauma life support is required. Decreasing reliance on the use of traditional strap on injuries and expensive Hollywood-style special effects for casualty care scenarios; the moulage training uniform is an appealing alternative. In one embodiment, the moulage training uniform provides realism in response, assessment, and treatment for early casualty care in a more believable delivery system than other moulage wounds; which may be attached over clothing or adhered to volunteers. The uniforms with adhering injuries or stand-alone magnetic injuries make large scale training exercises or mass casualty scenarios simpler as setup times are reduced, there is no need to train the trainers on complicated systems, and no need for prosthetic make-up which can be a lengthy process. These factors lead to more opportunities for trainees to learn "hands-on" medical evaluations within an environment where each repetition can be significantly altered within seconds.

In one embodiment, the system including moulage training uniform and simulation injuries can lead to cost saving as injuries can be relocated across the entire body reducing the need for purchasing moulage wounds designed to replicate an injury on a specific body part. For example, in one embodiment, there is no need for specific size injuries or cumbersome straps to attach on different size limbs. Having injuries that may be concealed under the trauma panels saves time and equipment. Removal of outerwear is very often needed to further treat injuries and having replaceable panels allows one section of the uniform to be cut or removed to expose the injury, reducing the need to replace articles of clothing for each scenario.

In one embodiment, the invention can be used by many medical specialties for rendering care, including first-aid students, law enforcement, fire departments, nursing programs, emergency medical technicians, paramedics, HAZ-MAT responders, the Red Cross, and wilderness survival instructors, in both the military and civilian settings. Embodiments of the invention aid in helping casualties, categorizing treatment of victims, communication of vital information to follow on responders in training for crisis response, emergency management, and mass casualty skills.

One embodiment is directed towards a method for providing medical training, utilizing wearable clothing with modular injury panels. The example methods herein provide an apparel system with highly adjustable forms of common medical concerns to conduct realistic casualty simulations. The user preference allows for customizations of design, pattern, color, texture, fabric, and plurality of attachments related to the system. There is further need for this apparel system to fit as many different body types as possible utilizing the expandable features of the uniform, to increase sizes, while offering speed in changing and no need for privacy as designed to be worn over existing clothing.

Modifications to the apparel using said injuries versus conventional methods is an advantage based on the users changing preferences, increasing the difficulty of the learning exercise from simple to difficult utilizing the modular system. Replacement of trauma windows and injuries allows for coordination of injuries and outward signs the clothing might demonstrate for different occasions and severity. Injuries may also be concealed so students may search for secondary wound sites not immediately visible for hands on practice of sweeping a casualty by palpating their torso and extremity. Descriptions of product use are directed towards live participants, it is clear that training manikins may be substituted without affecting the quality of training delivered. Inanimate or animated manikin training will be more realistic utilizing the uniform in it's configurations of trauma panel receptacles with fabric backed injury receptacle areas or the same panel areas with receptacle areas removed so instructors can access the animated anatomical models underneath the uniform to deliver simulated treatment.

There is a need for embodiments of the invention including but not limited to a modular moulage training attire providing those in the medical community continuous conversion of the same apparel with the accessories suitable for different occasions and user preferences. One embodiment allows instructors a method for customizing the moulage uniform and apparel based on user needs and requirement with realistic anatomical injuries to practice life-saving interventions on the human body as they would be required to do in the field with actual wounds of this nature.

While the present invention is shown using panels specific to the torso, arms, and legs of an individual, e.g., arranged on the front and/or back, it is understood that other regions of the human body are likewise applicable. The number of panels and their respective sizes are not limited to the illustrations. In one embodiment, training uniforms may have multiple panels over the same areas, such as three on the limbs to access joints, or panels omitted based on order preference. Additionally, simulation aids such as training manikins are compatible with the MTU methods of instruction.

Optionally and/or alternatively many modifications to the present invention and accessory components and is therefore understood that within the scope of the appended claims the invention may be used for teaching or practical applications other than specifically described. Moulage injuries may be comprised of a multilayered structure to replicate skin, tissue, muscle, bone, or internal organs and may be made of latex, rubber, or other durable material offering a realistic pliable replica of anatomical features. While the present invention is shown using panels specific to the torso, arms, and legs of an individual it is understood that other regions of the human body are likewise applicable.

One embodiment is directed towards an article of clothing, e.g., a moulage training uniform including a jacket, pants, and optionally under garments, e.g., shirt. The moulage training uniform can look like a military uniform or regular civilian attire, e.g., replicating clothing worn for day-to-day activities or in compliance of an organization's requirements. In one embodiment, the moulage training apparatus includes a modular system including a pretailored garment, with or without expendable side panels to provide one-size fits most users in the learning environment. The apparatus includes of a pair of trousers, long sleeve shirt, short sleeve shirt, overcoat, jumpsuit, all containing unique injury receptacle areas and is designed to disperse injuries across the entire torso and limbs of a patient in the regions most often associated with injuries. The apparatus can include fixed segments on the main garment, e.g., selected based on common injury sites and can encompass an entire human body to include the sleeves, legs, and torso and the like for one or more of an anterior and posterior injury. In one embodiment, the fixed segments include access panels that can be releasably attached with a mechanism that is configured to be non-rigid so it will not limit the user's freedom of movement or physical abilities. The attachment mechanism is described herein and any combination may be used.

In one embodiment, the access panel also called a panel, a trauma panel or a trauma window herein can include one or more panels. The access panels are configured to be releasably attached to the moulage training uniform and can include a panel of fabric having an outside surface and inside surface. The access panel is configured to hide a simulate injury and also obscuring manufactured moulage kits and panel fasteners. The access panels are removable with one more attachment mechanism, e.g., fasteners, the fasteners can include any mechanism configured to releasably attach a portion of a panel to a portion of the training uniform, e.g., buttons, hook-and-loop closure mechanism, zipper, draw strings, magnetic feature, combinations of the same and the like. In addition, injury simulant or also called a training aid herein can be configured to be releasably attached to the main garment via one or more fasteners and arranged under the access panels described herein. Optionally and/or alternatively, the training through these variations of fasteners can easily be interchanged.

In one implementation, the simulant injuries are configured to replicate those one might expect to see in an emergency or battlefield setting and will adhere to the uniform to remain stable for treatment in these areas. The injuries may be attached with any attachment mechanism described herein, e.g., buttons, hook-and-loop closure mechanism, zipper, draw strings, magnetic feature, combinations of the same and the like. In one embodiment, a hook-and-loop attachment mechanism is attached to a back side of the injury simulant.

In one embodiment, the access panel covers a port or hole in the moulage training uniform so when it is removed it exposes what is underneath the moulage training uniform, thereby providing access to support the use of other simulation aids such as training manikins, injuries adhered to the skin, wearable injuries, e.g., those designed to be secured around the limbs or torso.

In one embodiment, article of clothing also called a moulage training uniform herein, can have any number of access panels of shapes and sizes. In one embodiment, the moulage training apparatus includes ten trauma panels, e.g., two on the upper chest and two over the abdomen area, on both the left and the right to allow access to the four quadrants of the torso from the front and two on the back over the thoracic region, on the left and right, sleeves can be divided for trauma panels to be above and below the elbows extending to the shoulder and wrist, and pants can contain four trauma panels above and below the knees, on the left and right leg, extending to the hip and ankles. Again, the number of panels and their respective sizes are not limited to the illustrations herein. The article of clothing may have multiple panels over the same areas, such as three on the limbs to access joints, or panels omitted based on order preference.

In one embodiment, the moulage training article of clothing also called a moulage training uniform herein can be modeled after military uniform, everyday casual attire, sport attire, business attire, commercial uniform attire or any other type of style of clothing.

In one embodiment, the article of clothing can be a top, e.g., jacket, shirt, blouse or another similar garment made to cover the upper body of the patient. The blouse may be constructed to cover a portion of or all of the torso and arms of the wearer. The top may have a central opening allowing the wearer to put it on over their current clothing and expand sizes to fit as needed. The central opening may also have a closing mechanism, e.g., buttons, zipper, hook-and-loop mechanism combinations of the same or the like. The top may also be featured with a v-neck, regular collar, half-zip or pullover and not limited to the designs shown in illustrations. Keeping the outer garment form fitting allows the moulage injury to fit more snugly, remaining stable on a particular area of the anatomy so that first aid may be applied at the point of injury such as stabilizing joints. Tops are also available with a full-length zipper on the back to allow assembling in two pieces when fitting training manikins or dummies.

In one embodiment, the article clothing includes a bottom configured to cover a lower extremity portions of body of user, e.g., pants, skirt, shorts, half skirt or other commonly worn article. The bottoms may also contain an integrated belt drawstring, elastic waistband, pull cord or various other methods for cinching the size smaller to ensure a proper fit on individuals using a uniform larger than their stature. Bottoms where fabric extends to the ankle may feature on the inside a vertical zipper ending above the knee allowing the user to easily put them on over existing clothing and without removing their footwear.

One embodiment is directed towards trauma panels including unique injury receptacle areas, which can be dispersed across the entire torso, and limbs, of a patient garment in the regions most often associated with injuries to facilitate temporary attachment of wounds. These sections can be integrated into the clothing to secure exteriorly attached simulated injuries to the wearers existing attire, making them removable. In one embodiment, these can include attachments to the injury fixation area to anchor or secure injuries utilizing a combination of these elements including Zip locks seals, hook and loop fasteners, thread, ties, hooks, zippers, adhesives, buttons, elastic materials or any electro magnetic attachment to include electromagnetic forces and energy to include magnets. A combination of attachment devices can be used with a combination of anchoring devices for trauma panels based on user-required specifications.

In one embodiment, the access panels are dimensioned to allow enough room for emergency medicine providers the ability to address an injury on simulated skin while carrying out thorough examinations of the injured body part. Utilizing a larger sealing surface on the garment allows first responders to work on the injury simulates configured as wounds, e.g., small or large, by bandaging and securing injuries in place without exposing the patient's sensitive areas. A hook-and-loop attachment mechanism are coupled to an outside surface of the article clothing, e.g., with an adhesive, magnet, stiches, combinations of the same and the like. The size or dimension of the attachment mechanism is configured to allow multiple injuries to be placed in the same area or larger injuries with room around the site to adhere tape or other treatment bandages.

In one embodiment, the simulant injuries may include specialized tubing or reservoirs for the insertion of intravenous fluids (IV's) in more advanced kits, or practice sutures. IV's can be taped to the injuries or may allow needles to be inserted into the latex to practice proper care.

In one embodiment, the simulant injuries are configured to be located and quickly relocated for the next scenario, keeping injuries a surprise for the next responder. The access panels can be configured to allow for the passage of blood lines in an active bleeding kit with advanced injuries for more realistic training scenarios. Additionally injury simulants may be constructed to have self-contained fluid reservoirs for simulating bleeding. The active bleeding kits are known in the art.

In one embodiment, the access panels include a section where fabric covering an outside portion of the moulage apparatus is removable to allow an access point to the user through a portion of the moulage apparatus. That is, by removing the access panel a user can have the ability to see the simulant injury, e.g., casualty underneath, and provide access to support the use of other simulation aids such as training manikins, injuries needing to be adhered to the skin or those designed to be secured around the limbs or torso. The access panels also can allow for access underneath the patient's outer garments, working in conjunction with injuries attached to casualties such as simulant directly applied to a user's skin with an adhesive back, secured with fastening strap or other technique. Tops are also available with a full-length zipper on the back to allow assembling in two pieces when fitting training manikins or dummies.

In one embodiment is directed towards an access panel conversion kit including access panels as described herein that can work with traditional clothing in order to transform clothing to moulage apparatus. The kit can include an access panel having an outside surface and opposite inside surface with and attachment mechanism and another attachment mechanism configured to be attached to the clothing.

In one embodiment, the kits can include reinforced squares of hook-and-loop material configured to be adhered to the perimeter of the access panel, access panels, having compatible connection hook-and-loop material on top and bottom of the edges. Access panels can then be reapplied to the receptacle area after the appropriate injury has been selected and placed. In one embodiment, the hook-and-loop sections can be reversible, presenting material corresponding to the same pattern and weight of the article clothing. This allows user to use a combination of simulant injuries and/or injury.

One embodiment, the moulage training apparatus can include a combination of access panels that cover an opening on the moulage training apparatus that provides access through the moulage training apparatus and that cover attachment mechanism for receiving a simulant injury directly on the moulage training apparatus. The access panels can be a series of pockets, capable of opening partially or being completely removed, or may be a section of fabric that is complimentary of the trauma panel, as used in combination for the moulage training uniform, which is easily replaceable and removable. The access panels can be connected as described herein.

The medical training trauma windows can serve as a way for instructors to conceal injuries or they can be modified (burned, shredded, bloodied) to highlight a type of accident or possible wounds underneath. Trauma Windows are sections of the garments, coordinated matching fabric, with attachment methods along the edges which are then applied to their respective fastener to cover the casualty wounds. The securing method is designed to facilitate fast access to treat injuries without exposing the patient or damage their clothing. Replacement of trauma windows and injuries allows for coordination of injuries and outward signs the clothing might demonstrate for different occasions and severity. Injuries may also be concealed so students may search for secondary wound sites not immediately visible for hands on practice of sweeping a casualty by palpating their torso and extremity. In use, the access panels when removed give responders access to simulated injuries and area configured to receive one or more simulated injuries.

The moulage training apparatus, access panels and attachment mechanisms, e.g., hook-and-loop attachment mechanism, can include any color, pattern, e.g., camouflage popular colors. Moreover, the access panels can be in any size, shape or dimension. For example, the shape can be any geometric shape, e.g., square, rectangle, circle, triangle, pentagon, and the like. In a preferred embodiment, the size and shape of the access panel are configured to be larger than the simulant injury in order to conceal the injury.

Moreover, fabric or material utilized in the access panel or moulage training apparatus includes one or more fabric materials. The fabric material can include one or more of cloth material, synthetic material, polyester material, wool material, silk material, flax material, jute material, bamboo material, glass fiber material, nylon material, a micro fiber material, acrylic material, rayon material, polyurethane material, olefin material, thermoplastic material, synthetic fiber material, composite materials, polytetrafluoroethylene material and combinations of the same. In one embodiment, the fabric material includes a cotton material. In one embodiment, the fabric material includes a rayon material. In one embodiment, the fabric material includes a polyester material. In one embodiment, the fabric material includes a cotton material blend, a rayon material blend, a polyester material blend or combination of the same. In one embodiment, the material may include a microfiber material.

In one embodiment, the one or more expansion panels are made utilizing fabric having a design pattern or color that substantially replicates the design pattern or color of the moulage apparatus and access panels, e.g., available clothing options already manufactured from trousers, shirts, shorts, and coats to specifically intended articles of clothing for civilian and military uniforms having two tubular pant-legs or two sleeves. Embodiments of the invention relate to features allowing for the expansion of a garment using one or more components to appropriately expand and contract various users or for specific intentions such as additional layering where the original product would not provide the degree of comfort needed in close fitting attire.

In one embodiment, this expandable portion is achieved utilizing additional fabric that allows expansion that is hidden behind the closure mechanism, e.g., tucked or folded, until released with the adjoining fabric running coextensively with the original seams. In one embodiment, alterations can be constructed so additional material will create minimal interference to the wearer in the designed intent of usage and appear almost identical to original construction of a garment of that type.

In one embodiment, the expandable panels of the moulage apparatus allow for a one-size-fits-most users having a vast array of body types, sizes and even sexes. The moulage apparatus with expandable portions has a natural look from the tailoring process and a unique method of expanding the sleeves, legs or garment body portion increasing the sizing options of the wearers needs. Additional benefits of embodiments herein include increasing the ease of access of clothing while wearing gloves, casts, joint support devices such as braces, shoes, etc. as the tubular openings are designed with predetermined dimensions.

In one embodiment, the tops can include expandable panels running from the waistband up the lateral side to the armpit and down the sleeve. Expansion panels on pants, shorts, etc. for the bottom half of the body can be located on the outside leg of lower extremity garments. The expandable panels can be secured with a plurality of closure methods and mechanisms, e.g., zippers, hook-and-loop mechanism, buttons, combinations of the same and the like. In a preferred embodiment, the expandable panel is in a closed configuration to conceal the extra fabric material.

In one embodiment, the expandable fabric can be a stretchy material such as synthetic fiber known for its exceptional elasticity to allow a form fitting expansion, breathable mesh to provide ventilation, bright colors such as orange required by hunting regulations, or reflective material providing safety at night for pedestrians, cyclists or motorcycle riders. Of course, any material or combination of material as known in the art may be used.

In one embodiment, the expansion panels are integrated or removable sections of fabric either stitched alongside the lateral seam, attached using zippers, hook-and-loop mechanism, or buttons to create a wider waistband and leg accommodating more than one size trainee. In one embodiment, and shown in the figures herein, two-way zippers are shown allowing the integrated expansion panel to be utilized for a custom user experience. In one embodiment, the panels may be secured using a single one-way or two-way separating zipper running the length of designated seams or two sections of zippers for more precise fitting integrated into the section to be opened. In one embodiment, a panel below the knee to accommodate a cast on the lower leg or opening only the section around the knee to allow a mechanical brace to be worn inside the clothing. In one embodiment, expansion panels on the inseam running towards the growing area from the inside of the ankle or knee may also be reserved.

In one embodiment, the panels are interchangeable, meaning that while pants are shown with panels open and each side of the fabric sewn along the seams. It is also noted that the design incorporates for benefits of the concept customers may choose to have tapered cuts of fabric that can be zipped in and out as to not rely on one standard size. For example, a section of fabric, e.g., four-inch section of fabric can be ordered for a top to allow layering a thick sweater underneath the coat or a two (2) inch panel may be used for a lightweight layer and tighter fit. These removable panels will have two secured zippers behind the main expansion zipper as demonstrated in the accompanying drawings. When the main portion is opened each side section (where normally sewn into the garment) will provide full-length zippers to change the expansion panel size and/or material. Meaning panel widths, colors, fabric type and taper can all be adjusted based on manufacturing needs and unique customer needs. For example, a coat may come with two different size panels to layer cold weather gear underneath, a mesh fabric for breathability, or reflective panels for safety.

In one embodiment, expandable clothing may be configured and used with various aspects of the invention as described with reference to U.S. Patent Application No. 2010/0299804, which is hereby fully incorporated by reference.

In one embodiment, the simulated injury can include a wearable injury, e.g., a strap-on injury, a special effect style injury directly on the skin of user, e.g., made with makeup, a prosthesis injury to provide limited scope or no scope for personalization once applied to the skin or over the individual's outer garment.

In one embodiment, the simulated injuries are wounds designed for training techniques revolving around having realistic replicas of body structures including the skeletal system, circulatory system, body cavities and/or organs, which are scale modeled and embedded locally and accurately. The simulant injuries can be characterized and made of a component which is poured over the body part replica containing body structures negative molds to form a continuous outer skin and completely made in one piece. The simulant injuries can allow for sufficient flexibility for movements and natural appearance on the uniform. The moulage training apparatus can also be used with related art simulant injuries.

In one embodiment, the simulant injury include stick on wounds and larger strap on wounds. These wounds can be attached directly to a user or the moulage training uniform with hook-and-loop attachment mechanism, e.g., backed squares of durable "rubber skin" sold with the uniform to increase their survivability and application ease. The design of the simulant injury and placement is configured to be substantially anatomically correct injuries for the realistic practice of minimally invasive techniques to stabilize patients in the first responder setting. The simulant injury can be manufactured from a skin replica material to have the appearance of common injuries to include but not limited to: deformities, contusions, abrasions, penetrating/puncture wounds, burns, tenderness, laceration and swelling. The simulant injuries are used in embodiments at particular regions of the human body on the trauma training uniform's arms, legs, torso, both anteriorly and posteriorly. Each injury represents a different problem in casualty treatment. Various sizes and severity of similar moulage injuries, such as open fractures or burns, create variable conditions for the same injury type and can be designed to reflect the field conditions such an injury would be received in. Injuries will be appropriately colored to give the appearance of bruising, internal and external bleeding, varying degrees of burns, rashes or relay an exposure to chemical or radioactive materials. Elements of the design will enable injuries to be associated with trauma scenarios that are visually, physically and functionally true for the diagnosis of primary and secondary injuries.

In one embodiment, the simulated skin includes multiple layers of pliable material such as latex or rubber, may be hollow or solid, and uses a closure method for the attachment, fabric sewn along the outside edge, or hook and loop closure adhered to or integrated into the injury. Moulage injuries will be resilient for re-use over prolonged periods of time.

In one embodiment, a method of application of simulation injuries is a fastener system attached to, sewn on, or embedded in the injuries during the manufacturing process, which may be a hook-and-loop closure system. One example is a hook-and-loop system, so that the hook component is attached to the injury and the loop component is attached to the training uniform, or vice-versa. In the preferred embodiment the stitching or bonding agent is along the outer edge of the moulage piece, so the removal of the simulated injury occurs on the perimeter. These injuries can be modified to be used in active bleeding kits.

In one embodiment, simulant injury fastening straps can be utilized in order to allow injuries to be used in a standalone method. Straps can feature a self-adhering double-sided hook-and-loop mechanism, e.g., hook material on one side and loop on the other. These straps can be configured with quick release buckles or other coupling system.

One embodiment is directed towards a method of application of injuries that utilizes magnet attachment mechanism, e.g., utilizing magnets to allow a user to affix simulant injuries over existing clothing without the need of straps or other attachment mechanisms. These simulant injuries will have magnets such as neodymium iron boron (NdFeB), samarium cobalt (SmCo), alnico, and ceramic or ferrite magnets either embedded into the injury, sewn in, adhered to, or offered as an insert. That is, the magnets can be hidden inside the simulant injury to enhance realism. Optionally, kits can be used additional magnets, magnetic sheets, magnetic material such as steel, or any other compound needed to provide the opposite pole necessary to secure injuries in place.

In one embodiment, the attachment mechanisms described herein allow for rapid changing of injuries. Another method of attachment will be to produce products and embedding magnets into the casting medium. With magnets of varying sizes, strengths, and designs injuries can quickly be applied to outer layer of garments with another magnet or material to engage magnetic pull to secure injuries in place. Some injuries may include more than one magnetic point to ensure a natural appearance while holding the edges in place during movement. These injuries can be used in conjunction with the moulage training uniform or used alone for other scenarios. These magnetic moulage injuries will give those utilizing them the ability to place them anywhere on an individual providing there is a fabric to separate the two magnetic materials. To create further realistic appearances additional fabric matching the casualty's may be used in giving the facade of tears, burns, and bloodstains, the fabric can be inserted between the injury and garment giving the appearance that the wound site is exposed or caused the damage. These types of injuries are ideal for expeditious training or for secondary casualties in larger scenarios. If supplied magnets are lost the injuries will work with any other type of magnet or metallic items such as steel washers will work to stabilize moulage injury in place, keeping in mind the stronger the item the better the hold.

In one embodiment, magnetic injuries can also be used as a traditionally applied injury with adhesive.

In one embodiment, magnets may also be utilized with other attachment mechanisms, e.g., hook-and-loop system, e.g., sewn inside a hook-and-loop enclosure allowing these powerful magnets to pair with the hook-and-loop simulant injuries provides the ability for use in areas straps aren't practical as a magnetic injury. Magnetic injuries are suitable training aids as they can be attached anywhere on the body and may use the access panels for concealment and authenticity.

In one embodiment, the attachment mechanism for the simulant injury may be an adhesive, e.g., pressure-sensitive adhesive, self-adhesive, self-stick adhesive that are configured to provide a reusable function as they may be repositioned and secured to the simulated patient's skin or to that of a manikin. Direct application is needed and double sided tape may be used or the repositionable adhesive may be bonded to the injury.

In one embodiment, the simulant injuries can be active injuries requiring a more dynamic level of training. The active injuries are configured to deliver a fluid that mimics blood, e.g., with a fluid reservoir and delivery system for the use of simulated blood to enhance realism of injuries. The simulant injuries can be used with or without the reservoir and flow of fluid, e.g., blood. Various fluid reservoirs and delivery methods may be utilized by connecting to tubing integrated into the wound, permitting the external flow of a simulated body fluid to the surface for practice controlling bleeding. Examples of this may be through the uses of large fluid syringes, hand pumps, or squeezable containers that provide the connection through tubing to the injury. Importance on the realism of this method adds to the psychological and physiological stressors encountered in a real world environment; training builds confidence and competence for the necessary time the students transfer their skills to the real-world environment.

In one embodiment, simulant injuries are manufactured as a self-contained wound, meaning the fluid reservoir is embedded in the injury itself to be used without any additional support and placed using the various attachment methods as described herein.

Reference will now be made in detail to an embodiment of the present invention, example of which is illustrated in the accompanying drawings.

Figure 2:
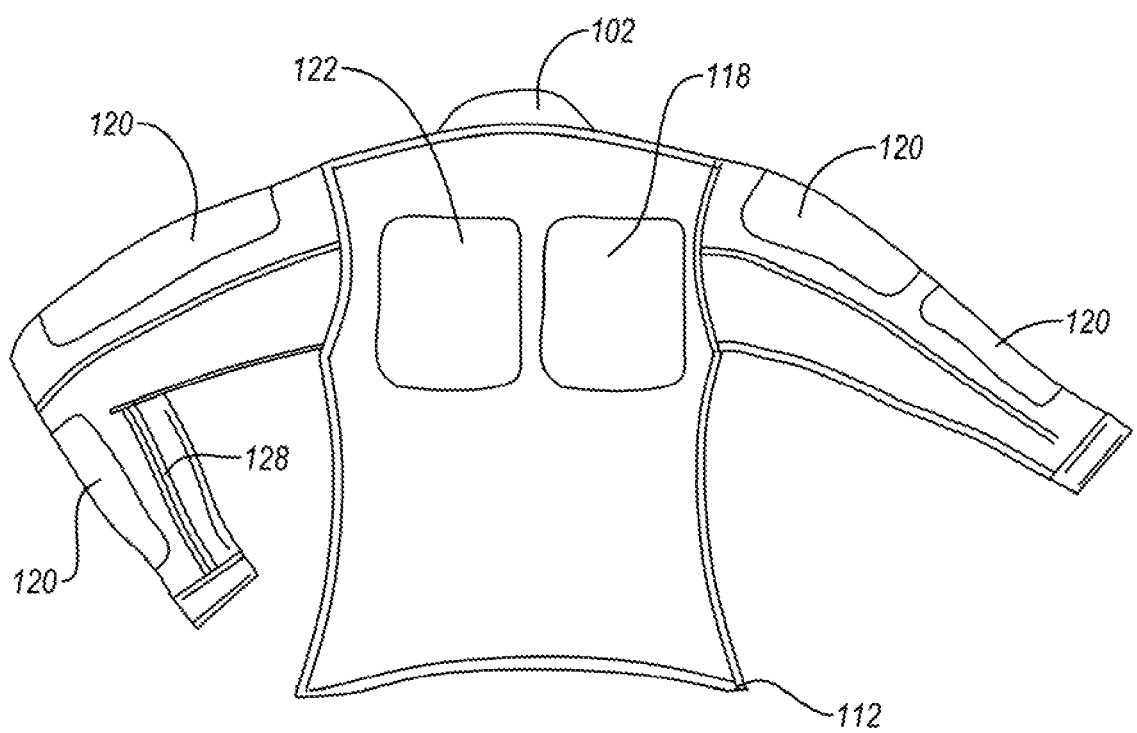
FIG. 2 illustrates a back view of the moulage training apparatus of FIG. 1.
Figure 3:
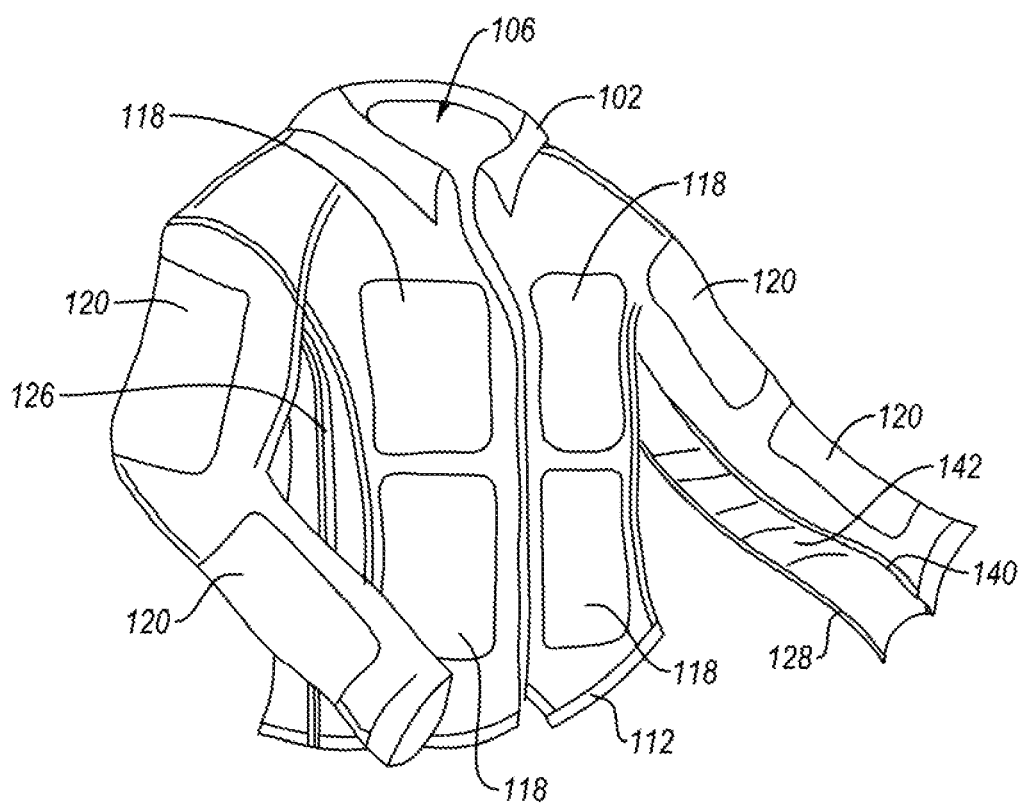
FIG. 3 illustrates a right side view of the moulage training apparatus of FIG. 1 in a partially expanded configuration.
Figure 4:
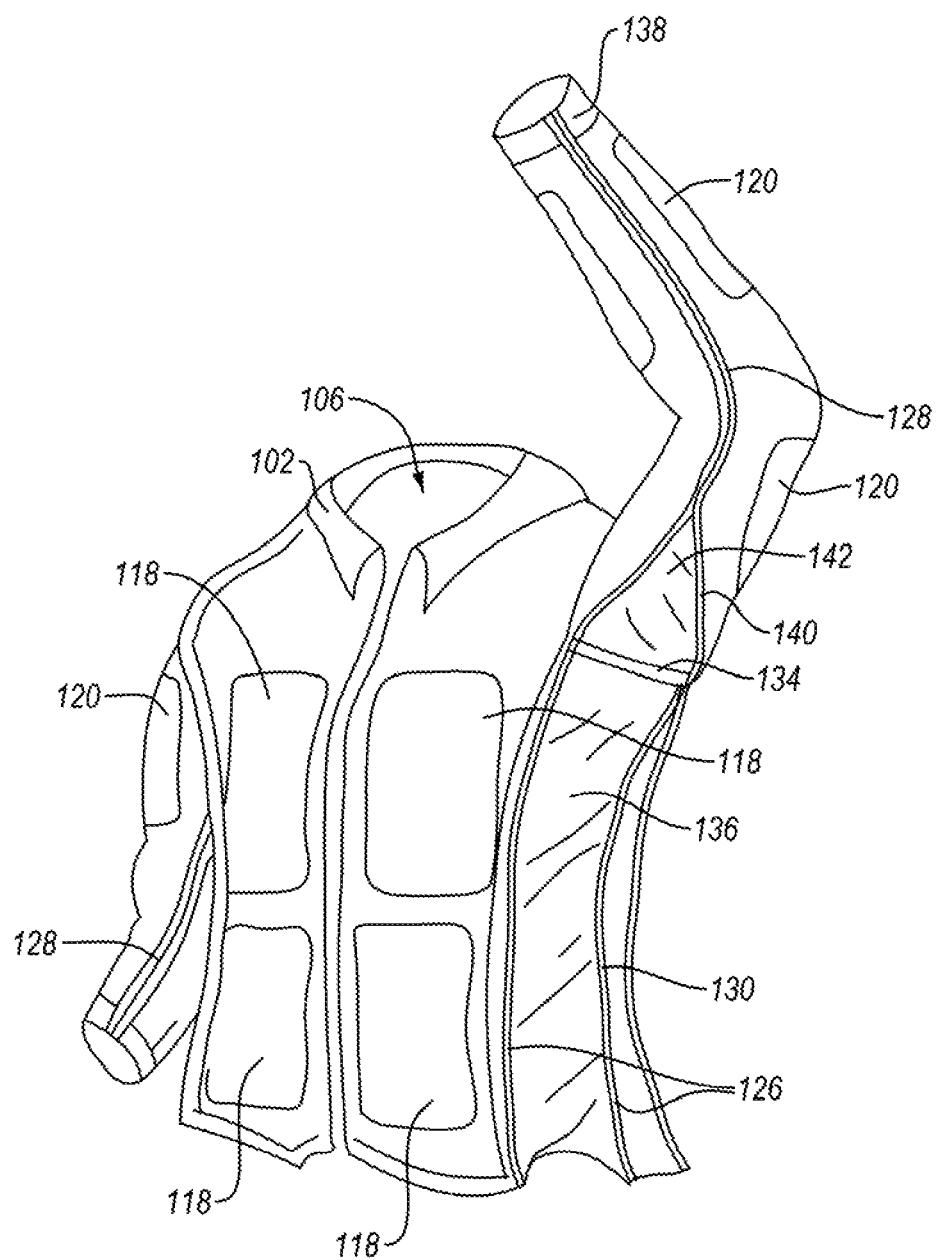
FIG. 4 illustrates a left side view of the moulage training apparatus of FIG. 1 in a partially expanded configuration.
Figure 5:
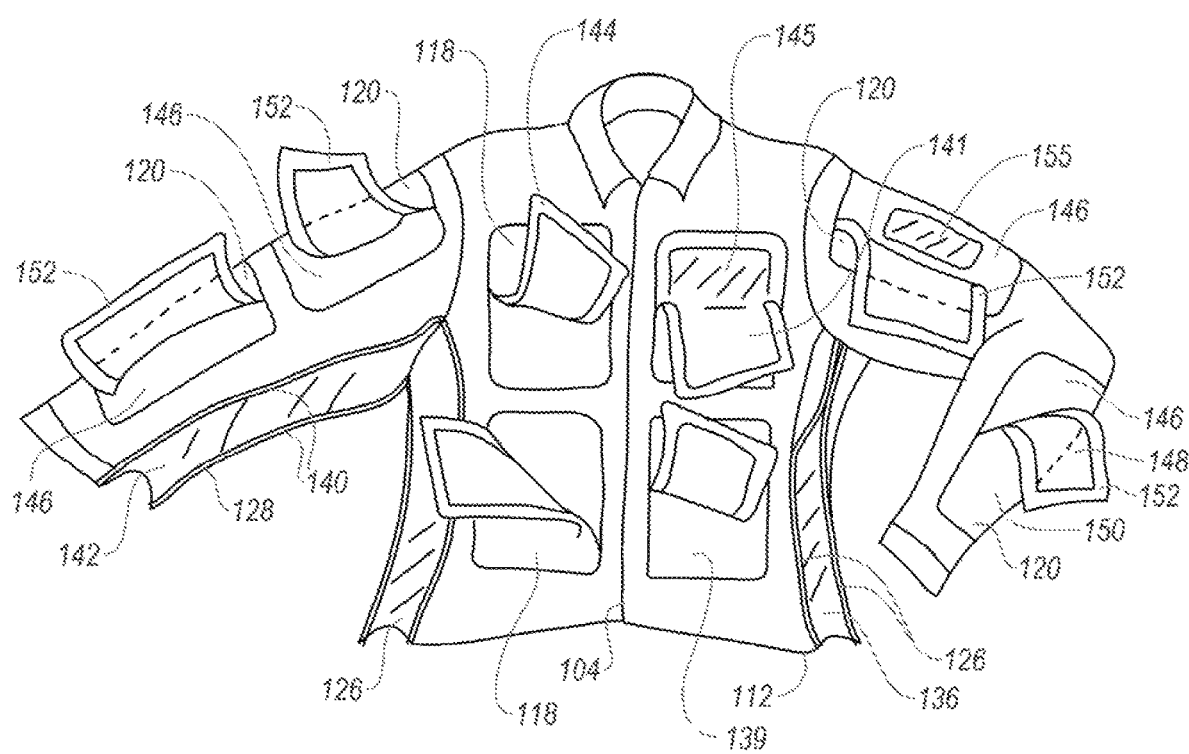
FIG. 5 illustrates a left side view of the moulage training apparatus of FIG. 1 in a partially expanded configuration with access panels in various states of configuration.

FIG. 1 is a front view of a moulage training apparatus according to an embodiment of the invention in a first orientation. FIG. 2 is a back view of the moulage training apparatus of FIG. 1. FIG. 3 is a right side view of the moulage training apparatus of FIG. 1 in a partially expanded configuration. FIG. 4 illustrates a left side view of the moulage training apparatus of FIG. 1 in a partially expanded configuration. FIG. 5 illustrates a left side view of the moulage training apparatus of FIG. 1 in a partially expanded configuration with access panels in various states of configuration.

Referring to FIGS. 1-5, the moulage training apparatus 100 is generally depicted with referent to number 100. The apparatus 100 in this embodiment is top of a user configured to cover an upper torso a user. More specifically, the apparatus 100 in this embodiment is an article of clothing configured as a unisex long sleeve garment and preferred embodiments of present invention.

The apparatus 100 is made from one or more fabric materials and includes a collar 102. The apparatus includes an open neck region 106, a shoulder region 108, a torso portion 110 extending from the shoulder portion 108 to a waist region 112. The apparatus 100 includes a first arm portion 114 and a second arm portion 116. The closable portion 104 extends from an open neck portion 106 through the torso portion 110 to the waist 112. The closable portion 104 can include any closing mechanism configured to open or close the apparatus 100. The closing mechanism 104 can include one or more of a button, a zipper, a two-way zipper, a hook-and-loop mechanism and combinations of the same. Optionally and/or alternatively, the closing mechanism 104 may be excluded or only extend partially into the neck 106 to the waist 112, e.g., the article 100 may be a pullover having a neck, e.g., v-neck, no collar, or standard neck.

The apparatus 100 includes a plurality of access panels. The access panels are configured to be releasably attached to the apparatus as described herein. In this embodiment, the access panels include four torso access panels 118 arranged on the front of the apparatus in a four-quadrant orientation, four arm access panels 120 having two access panels 120 on each arm 114 and 116 and two access back torso access panels 122. The torso access panels 118 are arranged on the front of the article clothing, e.g., in four quadrants.

The apparatus 100 also includes one or more expandable portions configured to change the size of the apparatus and allow it to be used for different users of different dimensions, e.g., height, weight and even sex.

The article of clothing 100 includes a torso expanding portion or mechanism 128 on each of side of the torso region. The torso expanding portion 128 includes an attachment mechanism 130, e.g., zipper, hook-and-loop, buttons, extending from below a first arm portion or armpit 134 through the torso portion 110 to the waist 112 and is configured to move in a first direction and second direction to close to open and close the expandable portion 126. Extra fabric 136 is arranged between the attachment mechanism 130 to allow the apparatus 100 or torso portion to expand from a first size in a closed position to a second size in an open position. The second size is greater than the first size.

The first arm portion 114 and second arm portion 116 each includes an arm expanding portion or mechanism 128 extending from a portion an armpit 134 a wrist portion 138. The arm expanding mechanism 128 includes an attachment mechanism 140, e.g., zipper, two-way zipper, hook-and-loop mechanism, buttons, extending from a first arm portion or armpit 134 through the arm portion 114/116 to the wrist 138 and configured to move in a first direction and second direction to close to open and close the expandable portion 138. Extra fabric 142 is arranged between the attachment mechanism 140, e.g., zipper, to allow the apparatus 100 or arm portion to expand from a first size in a closed position to a second size in an open position. The second size is greater than the first size.

Referring now to FIG. 5, the access panels 118 are attached to an outer surface of the apparatus 100 with an access panel attachment mechanism 139. The access panels 118 include an inside surface 141 and an outside surface 143. The inside surface 141 includes an access panel attachment mechanism 144 configured to at least partially correspond and releasably attach with the access panel attachment mechanism 139.

The access panel attachment mechanism 144 is attached to the inside surface 141 of the access panel 118 with one or more of stiches, staples, adhesive or the like. The attachment mechanism 139 is attached to the article 100 with one or more of stiches, staples, adhesive of the like. The attachment mechanisms 139 and 144 can be any attachment mechanism as described herein. In this embodiment, the attachment mechanism 139 and attachment mechanism 144 include a hook-and-loop system that work together in order to allow the access panel 118 to be releasably attached to the attachment mechanism 139. The attachment mechanism 139 is the loop portion and the attachment mechanism 144 is the hook portion.

In this embodiment, the attachment mechanism 139 is sized to correspond with the overall dimension of the access panel 118. However, the attachment mechanism 139 can be larger and or smaller than the dimension of the access panel 118. In one embodiment, the attachment mechanism 139 may cover the entire torso or be any dimension on the torso. Also, in this embodiment, the attachment mechanism 144 is a strip of material in this embodiment arranged around an inside perimeter portion of the access panel 118, e.g., the attachment mechanism is sized to have a thickness of about one inch or less.

Optionally and/or alternatively, the attachment mechanism 139 may include a void, hole or port 145 in the access mechanism 139, moreover the fabric of the fabric article 100 also has a corresponding void, hole or port to permit access through the article 100. The hole 145 can be any dimension or size in the interior region or perimeter of the attachment mechanism 139.

The arm access panels 120 are arranged on each arm 114 and 116. The access panels 120 are releasably attached to an outer surface of the apparatus 100 with an access panel attachment mechanism 146. The access panels 120 include an inside surface 148 and an outside surface 150. The inside surface 148 includes an access panel attachment mechanism 152 configured to at least partially correspond and releasably attach with the access panel attachment mechanism 146.

The access panel attachment mechanism 152 is attached to the inside surface 148 of the access panel 120 with one or more of stiches, staples, adhesive of the like. The attachment mechanism 146 is attached to the article 100 with one or more of stiches, staples, adhesive of the like. The attachment mechanisms 146 and 152 can be any attachment mechanism as described herein. In this embodiment, the attachment mechanism 146 and attachment mechanism 152 include a hook-and-loop system that work together in order to allow the access panel 120 to be releasably attached to the attachment mechanism 146. The attachment mechanism 146 is the loop portion and the attachment mechanism 152 is the hook portion.

In this embodiment, the attachment mechanism 146 is sized to correspond with the overall dimension of the access panel 120. However, the attachment mechanism 146 can be larger and or smaller than the dimension of the access panel 120. In one embodiment, the attachment mechanism 146 may cover the entire arm or be any dimension on the arm. Also, the attachment mechanism 152 is a strip of material in this embodiment arranged around an inside perimeter portion of the access panel 120, e.g., the attachment mechanism is sized to have a thickness of about one inch or less.

Optionally and/or alternatively, the attachment mechanism 146 may include a void, hole or port 155 in the access mechanism 146, moreover the fabric of the fabric article 100 also has a corresponding void, hole or port to permit access through the article 100. The hole 155 can be any dimension or size in the interior region or perimeter of the attachment mechanism 146.

In one embodiment, the expansion panels can be configured with extra material to achieve different sizes as set forth in Table 1.

TABLE 1

Expandable Sizes Moulage Training Uniform Long Sleeve Top

| Size | Height | Sleeve Length [inches] | Chest (Panels Closed) [inches] | Chest (Panels Opened) [inches] | |
|---|---|---|---|---|---|
| | | | | Panel One | Panel Two |
| Small | 5'0-5'6 | Up To 33 | Up To 37 | 37-42 | 42-47 |
| Standard | 5'6-6'1 | 33-36 | 37-41 | 41-46 | 46-51 |
| Long | <6'1 | 36-39 | 41-45 | 45-50 | 50-55 |

It is noted that the sizes in Table 1 are representative sizes and may be larger or smaller as adjusted by extra material of the expansion panels.

Figure 6:
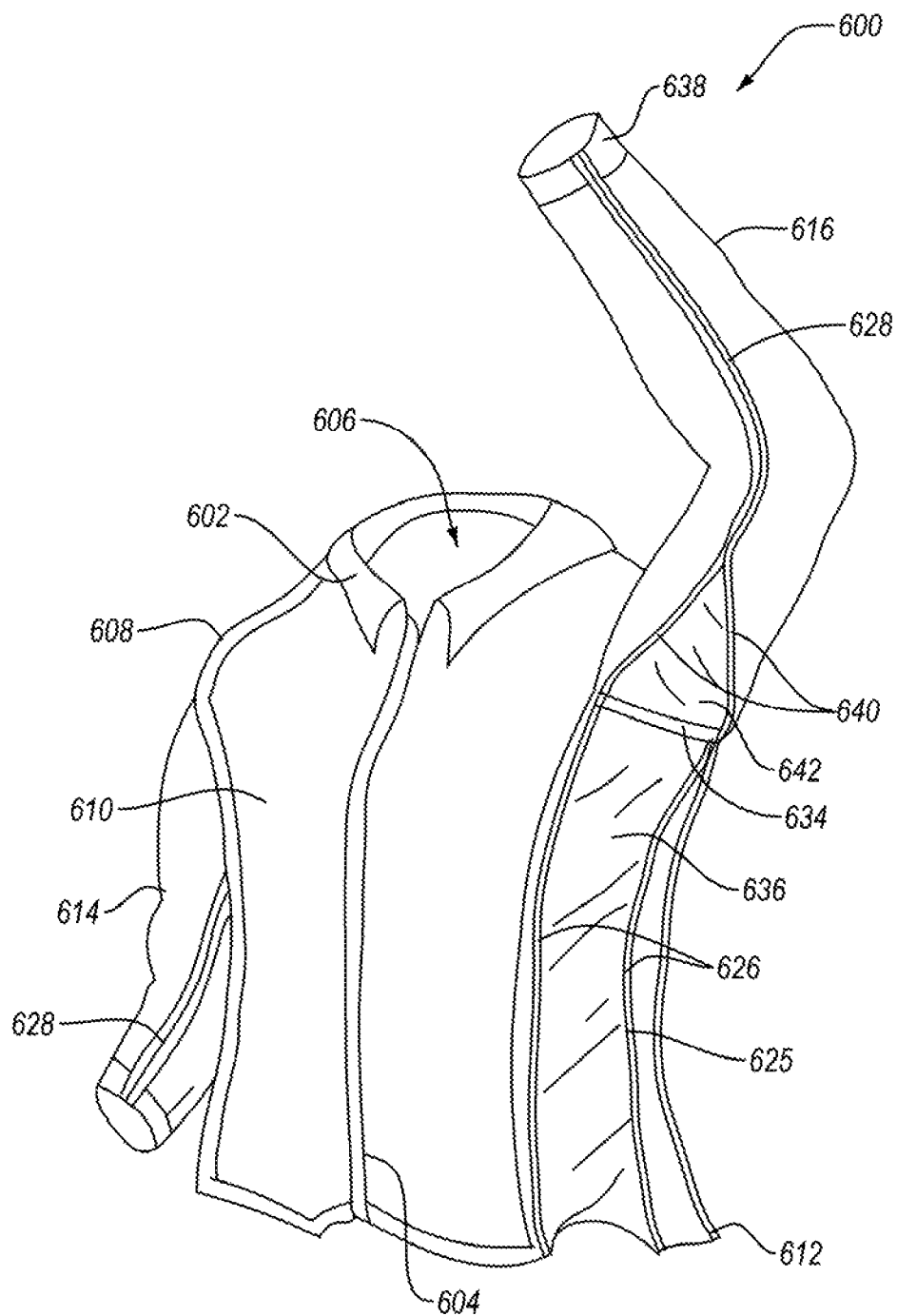
FIG. 6 illustrates a left side view of the moulage training apparatus of FIG. 1 in a partially expanded configuration with access panels in various states of configuration.

FIG. 6 is a front view of a moulage training apparatus having expansion mechanism or portion partially opened configuration according to another embodiment.

Referring to FIG. 6, the moulage training apparatus is generally depicted with reference number 600. The apparatus 600 in this embodiment is a top of a user configured to cover an upper torso of a user. More specifically, the apparatus 600 in this embodiment is an article of clothing configured as a unisex long sleeve garment and preferred embodiments of present invention.

The apparatus 600 is made from one or more fabric materials and includes a collar 602. The apparatus includes an open neck region 606, a shoulder region 608, a torso portion 610 extending from the shoulder portion 608 to a waist region 612. The apparatus 600 includes a first arm portion 614 and a second arm portion 616. The closable portion 604 extends from an open neck portion 606 through the torso portion 610 to the waist 612. The closable portion 604 can be include any closing mechanism configured to open or close the apparatus 600.

The closing mechanism 604 can include one or more of a button, a zipper, a two-way zipper, a hook-and-loop mechanism and combinations of the same. Optionally and/or alternatively, the closing mechanism 604 may be excluded or only extend partially into the neck 606 to the waist 612, e.g., the article 600 may be a pullover having a neck, e.g., v-neck, no collar, or standard neck.

The apparatus 600 also includes one or more expandable portions configured to change the size of the apparatus and allow it to be used for different users of different dimensions, e.g., height, weight and even sex. The article of clothing 600 includes a torso expanding portion or mechanism 625 on each of side of the torso region. The torso expanding portion 625 includes an attachment mechanism 626, e.g., zipper, hook-and-loop, buttons, extending from below a first arm portion or armpit 634 through the torso portion 610 to the waist 612 and is configured to move in a first direction and second direction to close to open and close the expandable portion 625. Extra fabric 636 is arranged between the attachment mechanism 626 to allow the apparatus 600 or torso portion to expand from a first size in a closed position to a second size in an open position. The second size is greater than the first size.

The first arm portion 614 and second arm portion 616 each includes an arm expanding portion or mechanism 628 extending from a portion an armpit 634 to a wrist portion 638. The arm expanding mechanism 628 includes an attachment mechanism 640, e.g., zipper, two-way zipper, hook-and-loop mechanism, buttons, extending from a first arm portion or armpit 634 through the arm portion 616 and 614 to the wrist 638 and configured to move in a first direction and second direction to close to open and close the expandable portion 628. Extra fabric 642 is arranged between the attachment mechanisms 642 to allow the apparatus 600 or arm portion to expand from a first size in a closed position to a second size in an open position. The second size is greater than the first size.

Figure 7:
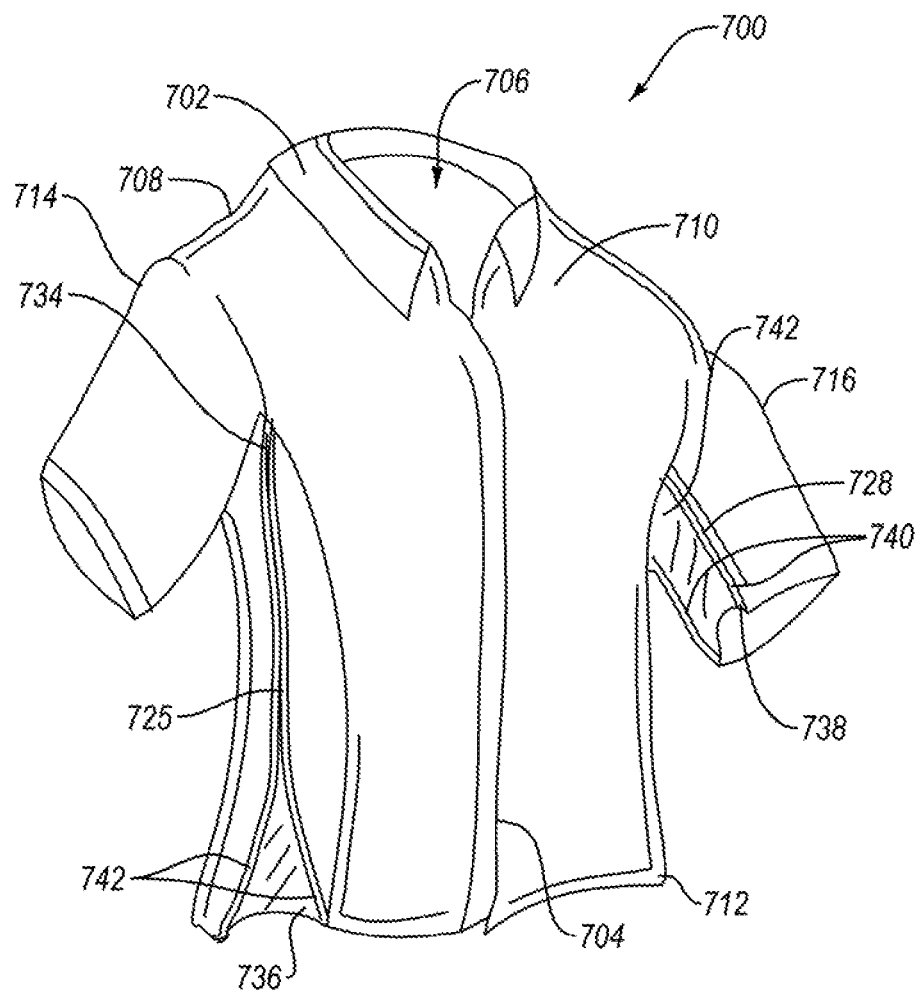
FIG. 7 illustrates a front view of a moulage training apparatus having expansion mechanism or portion partially opened configuration according to another embodiment.

FIG. 7 is a front view of a moulage training apparatus having expansion mechanism or portion partially opened configuration according to another embodiment.

Referring to FIG. 7, the moulage training apparatus is generally depicted with reference number 700. The apparatus 700 in this embodiment is a top of a user configured to cover an upper torso of a user as a short sleeve version. More specifically, the apparatus 700 in this embodiment is an article of clothing configured as a unisex short sleeve garment and preferred embodiments of present invention.

The apparatus 700 is made from one or more fabric materials and includes a collar 702. The apparatus includes an open neck region 706, a shoulder region 708, a torso portion 710 extending from the shoulder portion 708 to a waist region 712. The apparatus 700 includes a first arm portion 714 and a second arm portion 716. The closable portion 704 extends from an open neck portion 706 through the torso portion 710 to the waist 712. The closable portion 704 can include any closing mechanism configured to open or close the apparatus 700.

The closing mechanism 704 can include one or more of a button, a zipper, a two-way zipper, a hook-and-loop mechanism and combinations of the same. Optionally and/or alternatively, the closing mechanism 704 may be excluded or only extend partially into the neck 706 to the waist 712, e.g., the article 700 may be a pullover having a neck, e.g., v-neck, no collar, or standard neck.

The apparatus 700 also includes one or more expandable portions configured to change the size of the apparatus and allow it to be used for different users of different dimensions, e.g., height, weight and even sex. The article of clothing 700 includes a torso expanding portion or mechanism 725 on each of side of the torso region. The torso expanding portion 725 includes an attachment mechanism 742, e.g., zipper, hook-and-loop, buttons, extending from below a first arm portion or armpit 734 through the torso portion 710 to the waist 712 and is configured to move in a first direction and second direction to close to open and close the expandable portion 725. Extra fabric 736 is arranged between the attachment mechanism 742 to allow the apparatus 700 or torso portion to expand from a first size in a closed position to a second size in an open position. The second size is greater than the first size.

The first arm portion 714 and second arm portion 716 each includes an arm expanding portion or mechanism 728 extending from a portion an armpit 734 to a portion of the article of clothing that stops near a bicep portion 738. The arm expanding mechanism 728 includes an attachment mechanism 740, e.g., zipper, two-way zipper, hook-and-loop mechanism, buttons, extending from a first arm portion or armpit 734 through the arm portion 716 to the end of a sleeve 738 and configured to move in a first direction and second direction to close to open and close the expandable portion 728. Extra fabric 742 is arranged between the attachment mechanisms 740 to allow the apparatus 700 or arm portion to expand from a first size in a closed position to a second size in an open position. The second size is greater than the first size.

Figure 8:
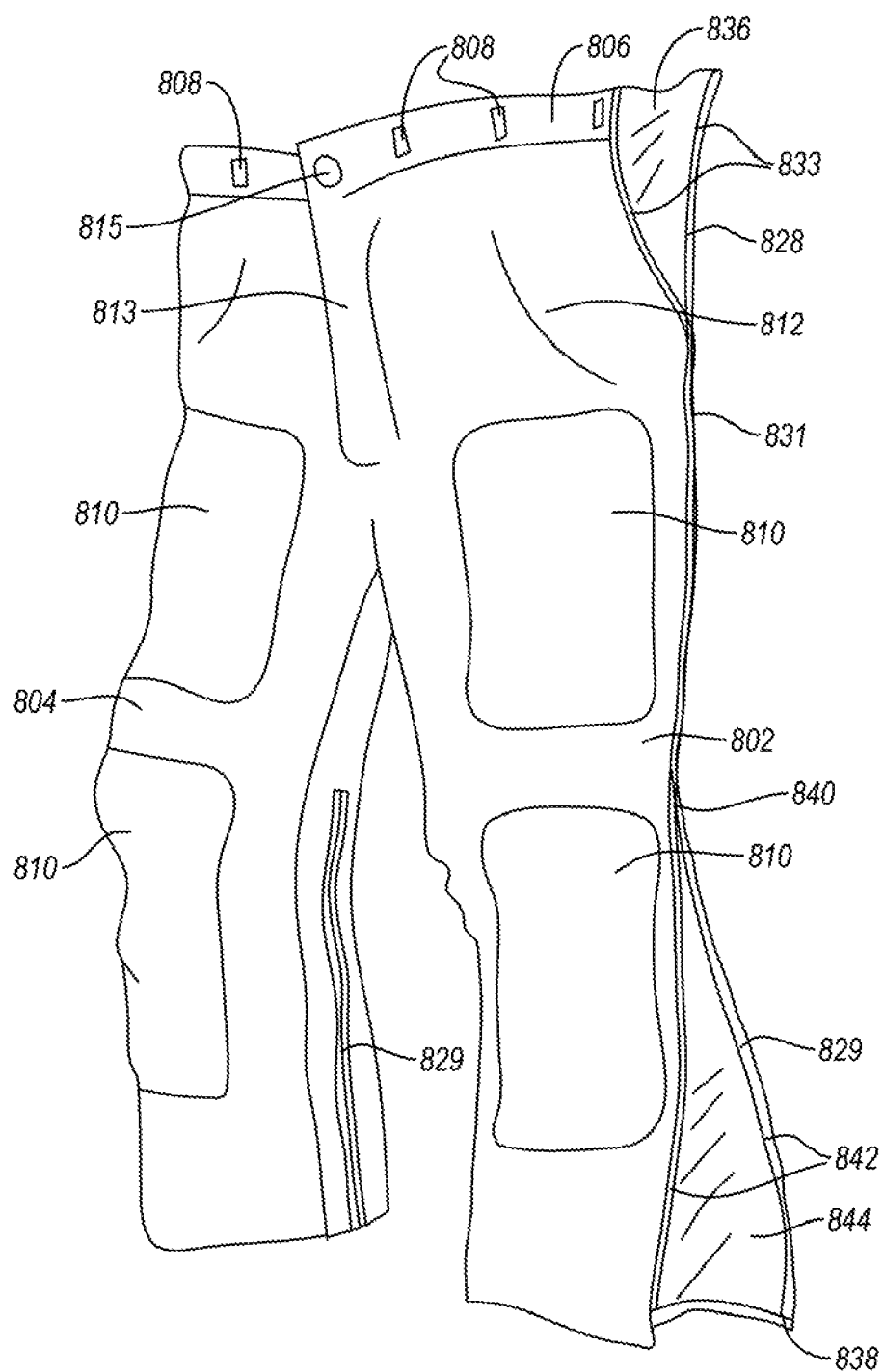
FIG. 8 illustrates a front perspective view of moulage training apparatus according to another embodiment of the invention.
Figure 9:
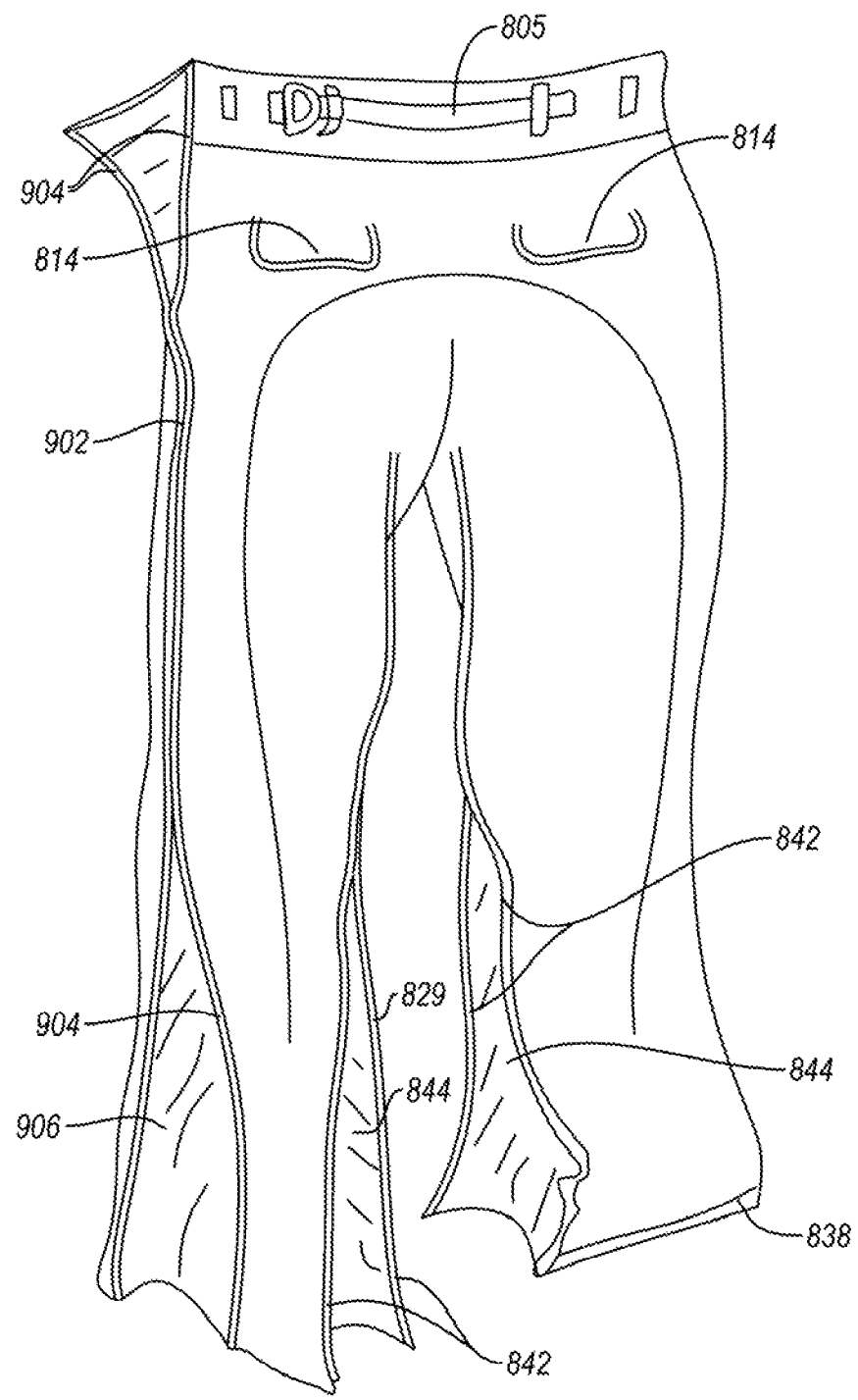
FIG. 9 illustrates a back view of the moulage training apparatus of FIG. 8.
Figure 10:
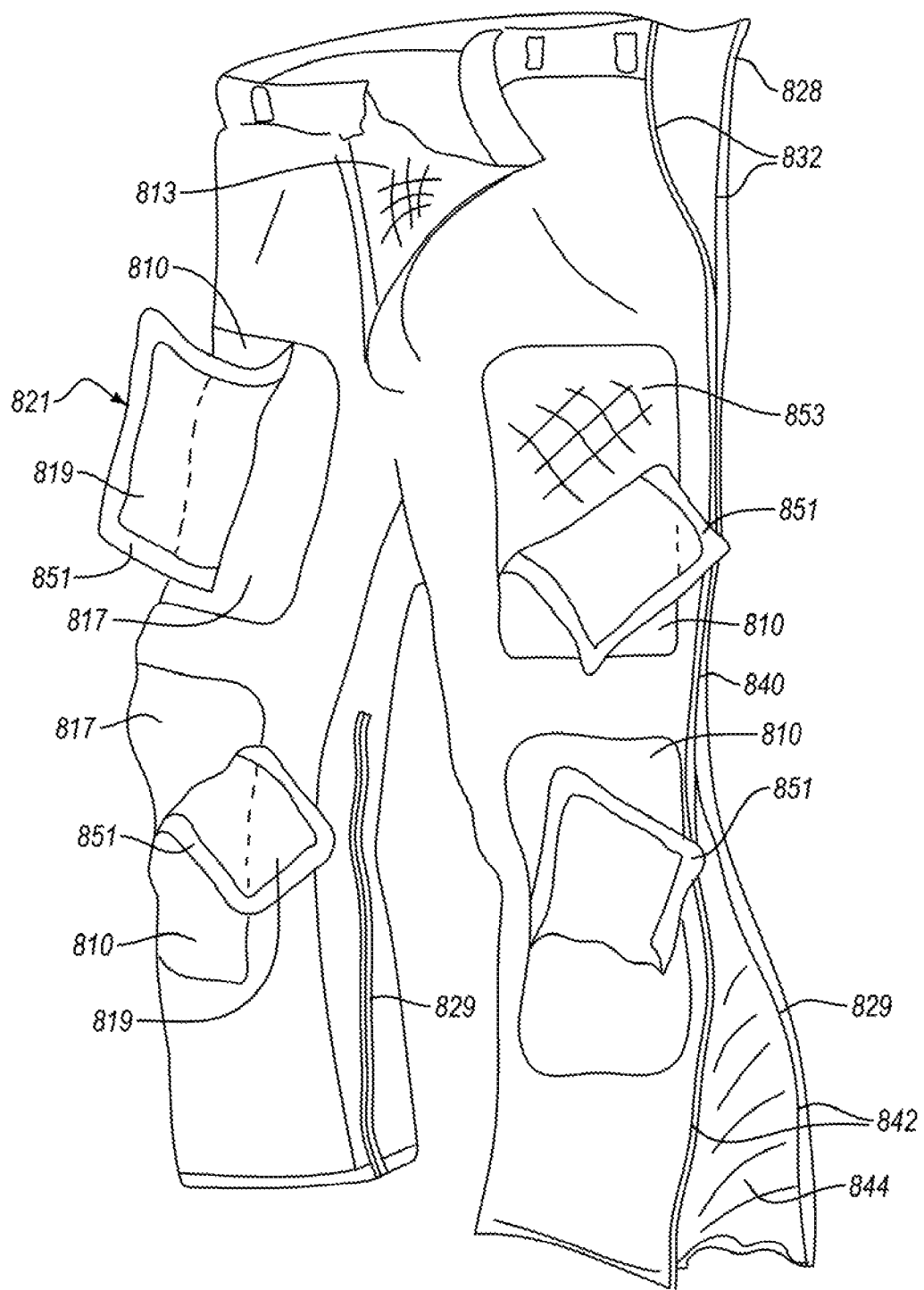
FIG. 10 illustrates a front view of the moulage training apparatus of FIG. 8 with access panels in various stages of removal.

FIG. 8 is a front perspective view of moulage training apparatus according to another embodiment of the invention. FIG. 9 is a back view of the moulage training apparatus of FIG. 8. FIG. 10 is a front view of the moulage training apparatus of FIG. 8 with access panels in various stages of removal.

Referring to FIG. 8-10, the apparatus is generally depicted with reference to number 800. The apparatus 800 is a moulage training bottom or pants for a user and configured to cover legs and a lower waist portion of a user. More specifically, the apparatus 800 in this embodiment is an article of clothing configured as a unisex long pants garment and preferred embodiments of present invention.

Referring to reference number 800, the standard unisex lower garment includes one or more fabric materials configured as first pant leg 802, a second pant leg 804, a waist or waist region 806. The waist 806 may have elastic sewn in, and manufactured with or without belt loops 808. Optionally, the waist 806 may include an area for elastic waistband or webbing to cinch the back of the garment to fit those with a smaller waist, e.g., internal or external to the waist. The pants can also have a waist with belt loops 808 for receiving a conventional belt or d-ring style belt 805 allows users to tighten the waist on the pants. The apparatus 800 also can include front pockets 812 and rear pockets 814. In addition, the apparatus 800 can include a conventional closure system with fly 813 and closing mechanism 815, e.g., snap, button, or the like.

The first leg 802 and second leg 804 include a plurality of access panels 810 on the front and/or back of each leg. In this embodiment, there are four access panels 810 two panels on each leg. The access panels 810 are configured to be releasably attached to the apparatus as described herein. The apparatus 800 also includes one or more expandable portions configured to change the size of the apparatus and allow it to be used for different users of different dimensions, e.g., height, weight and even sex.

The article of clothing 800 includes an outside leg expanding portion or mechanism as an upper outside leg expanding portion 828 and a lower outside leg expanding portion 829 on the outside seam of each leg. Optionally, the upper mechanism 828 and lower mechanism 829 may be joined as one mechanism or alternatively only include a lower mechanism 829 or upper mechanism 828 or any combination thereof.

The upper outside leg expanding mechanism 828 extends from the waist 806 through an upper portion of the leg to a lower hip region 831, e.g., to above the knee. The mechanism 828 includes an attachment mechanism 833, e.g., zipper, hook-and-loop, buttons, extending from below a waste to hip region 831 and is configured to move in a first direction and second direction to close to open and close the expandable portion 828. Extra fabric 836 is arranged between the attachment mechanisms 833 to allow the upper portion of apparatus 800 to expand from a first size in a closed position to a second size in an open position. The second size is greater than the first size.

The lower outside leg expanding mechanism 829 extends from an ankle region 838 through a lower portion of the leg to a knee region 840. The mechanism 829 includes an attachment mechanism 842, e.g., zipper, hook-and-loop, buttons, extending from below a knee region 840 and is configured to move in a first direction and second direction to close to open and close the expandable portion 829. Extra fabric 844 is arranged between the attachment mechanisms 842 to allow the upper portion of apparatus 800 to expand from a first size in a closed position to a second size in an open position. The second size is greater than the first size. Optionally, and/or alternatively, the zippers utilized in any of expansion panels can include one or more two-way zippers.

Referring to FIG. 9, showing an alternative embodiment where the lower attachment mechanism 829 and upper attachment mechanism 828 of FIG. 8 are one continuous mechanism 902. That is, the mechanism 902 includes an attachment mechanism 904, e.g., zipper, hook-and-loop, buttons, extending from a waist 806 to an ankle 838. The zipper 904 is a two-way zipper or two two-ways zippers configured to move in a first direction and second direction to close to open and close the expandable portion 902. Extra fabric 906 is arranged between the attachment mechanisms 904 to allow the upper portion of apparatus 900 to expand from a first size in a closed position to a second size in an open position. The second size is greater than the first size.

Referring now to FIG. 10, the access panels 810 are attached to an outer surface of the apparatus 800 with an access panel attachment mechanism 817. The access panels 810 include an inside surface 819 and an outside surface 821. The inside surface 819 includes an access panel attachment mechanism 851 configured to at least partially correspond and releasably attach with the access panel attachment mechanism 817.

The access panel attachment mechanism 851 is attached to the inside surface 819 of the access panel 810 with one or more of stiches, staples, adhesive of the like. The attachment mechanism 817 is attached to the article 800 with one or more of stiches, staples, adhesive of the like. The attachment mechanisms 817 and 851 can be any attachment mechanism as described herein. In this embodiment, the attachment mechanism 817 and attachment mechanism 851 include a hook-and-loop system that work together in order to allow the access panel 810 to be releasably attached to the attachment mechanism 817. The attachment mechanism 817 is the loop portion and the attachment mechanism 851 is the hook portion.

In this embodiment, the attachment mechanism 817 is sized to correspond with the overall dimension of the access panel 810. However, the attachment mechanism 817 can be larger and or smaller than the dimension of the access panel 810. In one embodiment, the attachment mechanism 817 may cover the entire leg region or be any dimension on the leg or pant. Also, the attachment mechanism 851 may be a strip of material in this embodiment arranged around an inside perimeter portion of the access panel 810, e.g., the attachment mechanism is sized to have a thickness of about one inch or less.

Optionally and/or alternatively, the attachment mechanism 817 may include a void, hole or port 853 in the access mechanism 817, moreover the fabric of the fabric article 800 also has a corresponding void, hole or port to permit access through the article 800. The hole 853 can be any dimension or size in the interior region or perimeter of the attachment mechanism 817.

In one embodiment, the expansion panels can be configured with extra material to achieve different sizes as set forth in Table 2.

TABLE 2

Moulage Training Uniform Bottoms

| Size | Height | Leg Inseam [inches] | Waist (Panels Closed) [inches] | Waist (Panels Opened) [inches] | |
|---|---|---|---|---|---|
| | | | | Panel One | Panel Two |
| Small | 5'0-5'6 | Up to 29½ | 26-31 | 31-36 | 36-41 |
| Standard | 5'6-6'1 | 29½-33½ | 31-35 | 35-40 | 40-45 |
| Long | <6'1 | 33½-36½ | 35-39 | 39-44 | 44-49 |

It is noted that the sizes in Table 2 are representative sizes and may be larger or smaller as adjusted by extra material of the expansion panels.

Figure 11:
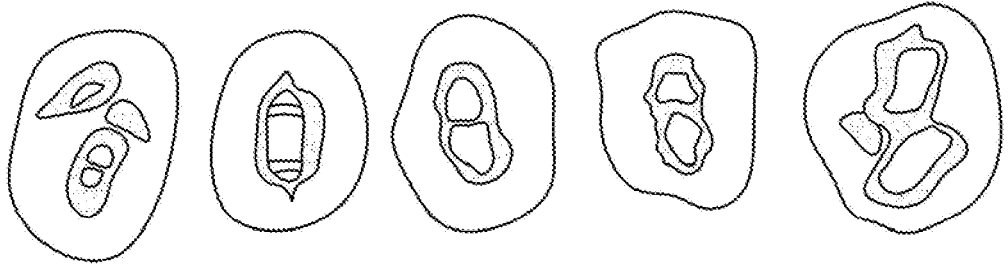
FIG. 11 illustrates a plurality of different simulant injuries according to another embodiment of the invention.
Figure 11:
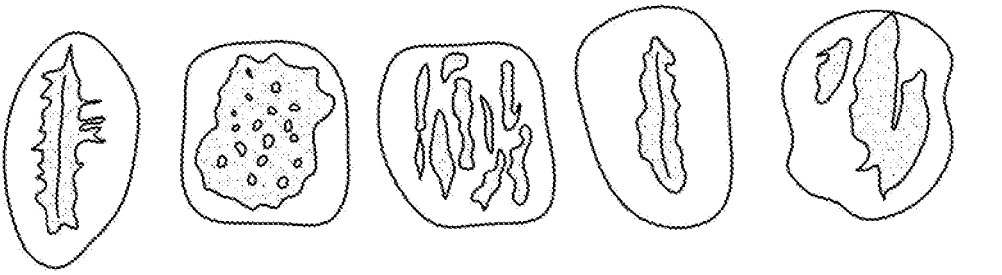
Figure 11:
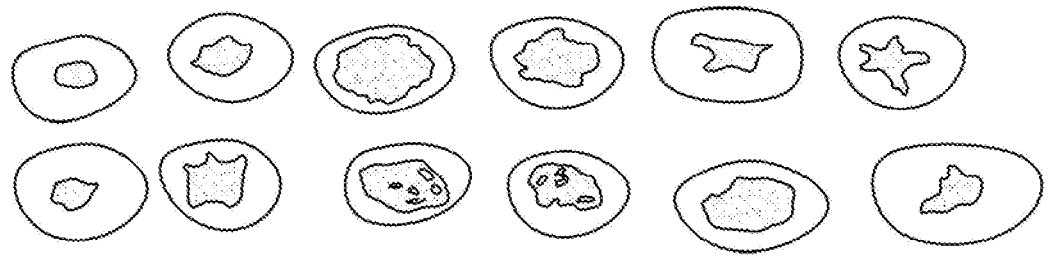

FIG. 11 is a view of various simulant injuries according to another embodiment.

Referring to FIG. 11, various different types of simulant injuries are shown. The injuries can be constructed from various different materials as described herein, e.g., a clay material, a thermoplastic material, an elastic material, a rubber material, a silicon material and combinations of the same. The injuries are configured to include a decoration and three-dimensional structure to mimic the look and feel of a wound.

The simulant injuries can be actively configured to deliver a fluid mimicking blood from a fluid reservoir with and without a pump with various tubing. One embodiment, includes a blood delivery system as described with reference to U.S. Pat. No. 8,221,129, which is hereby incorporated by reference.

In embodiments herein the simulant injury is releasably attached to the moulage training apparatus typically under an access panel. Optionally, the injury is releasably attached directly to the moulage training apparatus to a user with various attachment mechanisms, e.g., adhesive, wearable strap, hook-and-loop attachment mechanism, magnets and combinations of the same and the like.

In one embodiment, the simulant injuries can be manually adhered to users through glues and resins, applied with a pressure sensitive adhesive, strapped on to limbs or the torso, held in place using magnetic forces, or attached to hook-and-loop system and combinations of the same. The simulants are typically arranged on particular regions of the human body on the trauma training uniform's arms, legs, torso, both anteriorly and posteriorly.

In this embodiment, the simulant injuries are generally depicted with reference to number 1100. The simulant injures can include injuries to mimic one or more of broken bones and fractures 1102. The simulant injures can include injuries to mimic one or more of contusions, abrasions, burns and eviscerations depicted by injuries represented with number 1104. The simulant injures can include injuries to mimic one or more of deformities, lacerations and avulsions depicted by injuries represented with number 1106. The simulant injures can include injuries to mimic one or more of gunshot, penetrating and puncture wounds depicted by injuries represented with number 1108.

In embodiments, the simulant injuries are designed for training techniques revolving around having realistic replicas of body structures including the skeletal system, circulatory system, body cavities and/or organs, which are scale modeled and embedded locally and accurately. These simulant injuries can include a plurality of bendable layers arranged to replicate the visual and tactile properties of human tissue and will also allow for sufficient flexibility and movements for a natural appearance on the body, over clothing, or used in conjunction with the moulage apparatus. The simulant injuries may also include a multi-layered construction to replicate skin, tissue, muscle, bone, or internal organs and may be made of latex, rubber, or other durable material offering a realistic, pliable replica, of anatomical features. In one embodiment, the simulant injuries include injuries as described with reference to U.S. Pat. No. 8,221,129, which is hereby incorporate by reference as if fully set forth herein.

Figure 12:
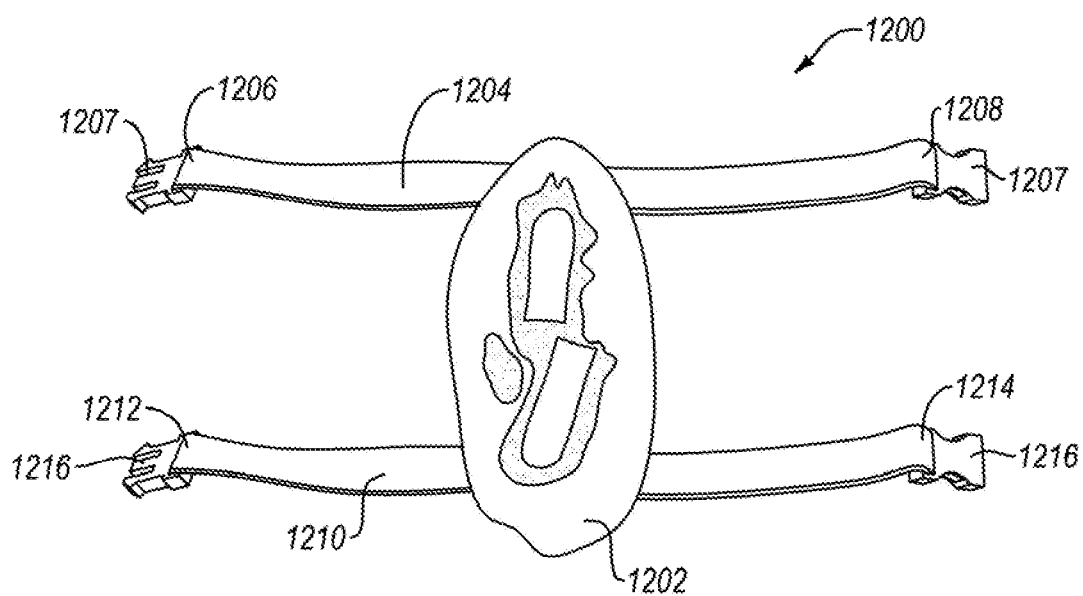
FIG. 12 illustrates a wearable simulant injury according to another embodiment of the invention.

FIG. 12 illustrates a wearable simulant injury according to another embodiment of the invention.

Referring to FIG. 12, the wearable injury simulant injury is generally depicted with reference to number 1200. The simulant injury 1202 can include any injury simulant described herein. The injury simulant 1202 is configured to be attached to a user with a first strap 1204 having a first end 1206 and second end 1208. The first end 1206 includes an attachment mechanism to releasably couple to an attachment mechanism 1207 of the second end 1208. The attachment mechanism 1207 can include a male and female buckle, hook-and-loop attachment system, a buckle system, snaps, buttons and combinations of the same. The straps are attached to the simulant injury through two slots, by an adhesive, sewn on the simulant injury, snaps or any other attachment mechanism.

The simulant injury 1202 can include any injury simulant described herein. The injury simulant 1202 is configured to be attached to a user with a first strap 1204 having a first end 1206 and second end 1208. The first end 1206 includes an attachment mechanism 1207 to releasably couple to an attachment mechanism 1207 of the second end 1208. The attachment mechanism 1207 can include a male and female buckle, hook-and-loop attachment system, a buckle system, snaps, buttons and combinations of the same. The strap is attached to the simulant injury 1202 through two slots, by an adhesive, sewn on the simulant injury, snaps or any other attachment mechanism.

The simulant injury 1202 can include any injury simulant described herein. The injury simulant 1202 is configured to be attached to a user with a second strap 1210 having a first end 1212 and second end 1214. The first end 1212 includes an attachment mechanism 1216 to releasably couple to an attachment mechanism 1216 of the second end 1214. The attachment mechanism 1216 can include a male and female buckle, hook-and-loop attachment system, a buckle system, snaps, buttons and combinations of the same. The strap 1210 is attached to the simulant injury 1202 through two slots, by an adhesive, sewn on the simulant injury, snaps or any other attachment mechanism. Optionally and/or alternatively, the first strap 1204 and second strap 1210 may include only one strap or more than one strap. The straps may be made of any fabric described herein, e.g., elastic or non-elastic material.

Figure 13:
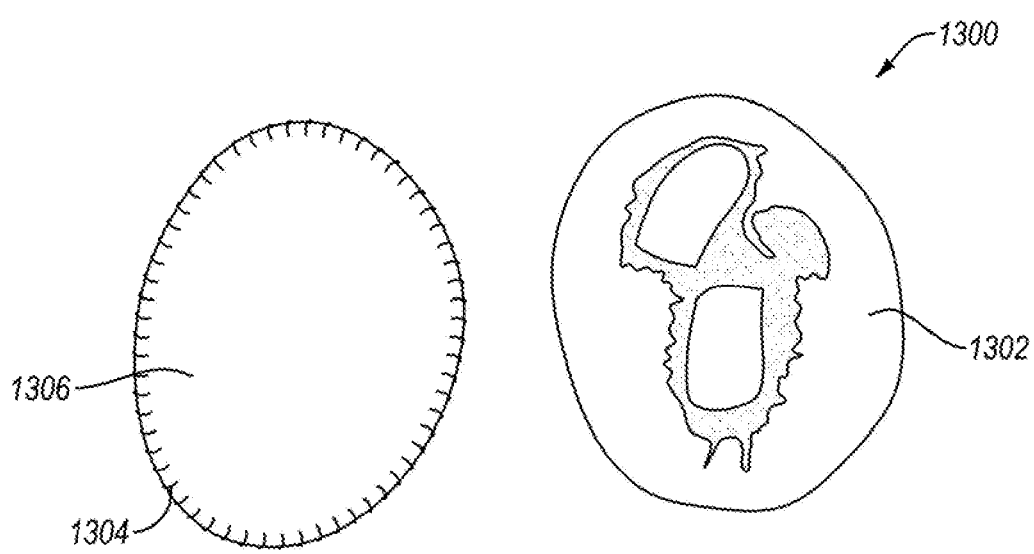
FIG. 13 illustrates a simulant injury attachment mechanism according to another embodiment of the invention.

FIG. 13 illustrates a simulant injury and attachment mechanism according to another embodiment of the invention.

Referring to FIG. 13, the wearable injury simulant injury and attachment mechanism is generally depicted with reference to number 1300. The simulant injury 1300 includes a first side 1302 showing the simulate injury and a second side 1304 having the attachment mechanism configured to be releasably attached to a moulage apparatus as described herein. In this embodiment, the attachment mechanism is a hook-and-loop material sewn 1306 or attached one side of the simulate injury 1302 with fabric.

Figure 14:
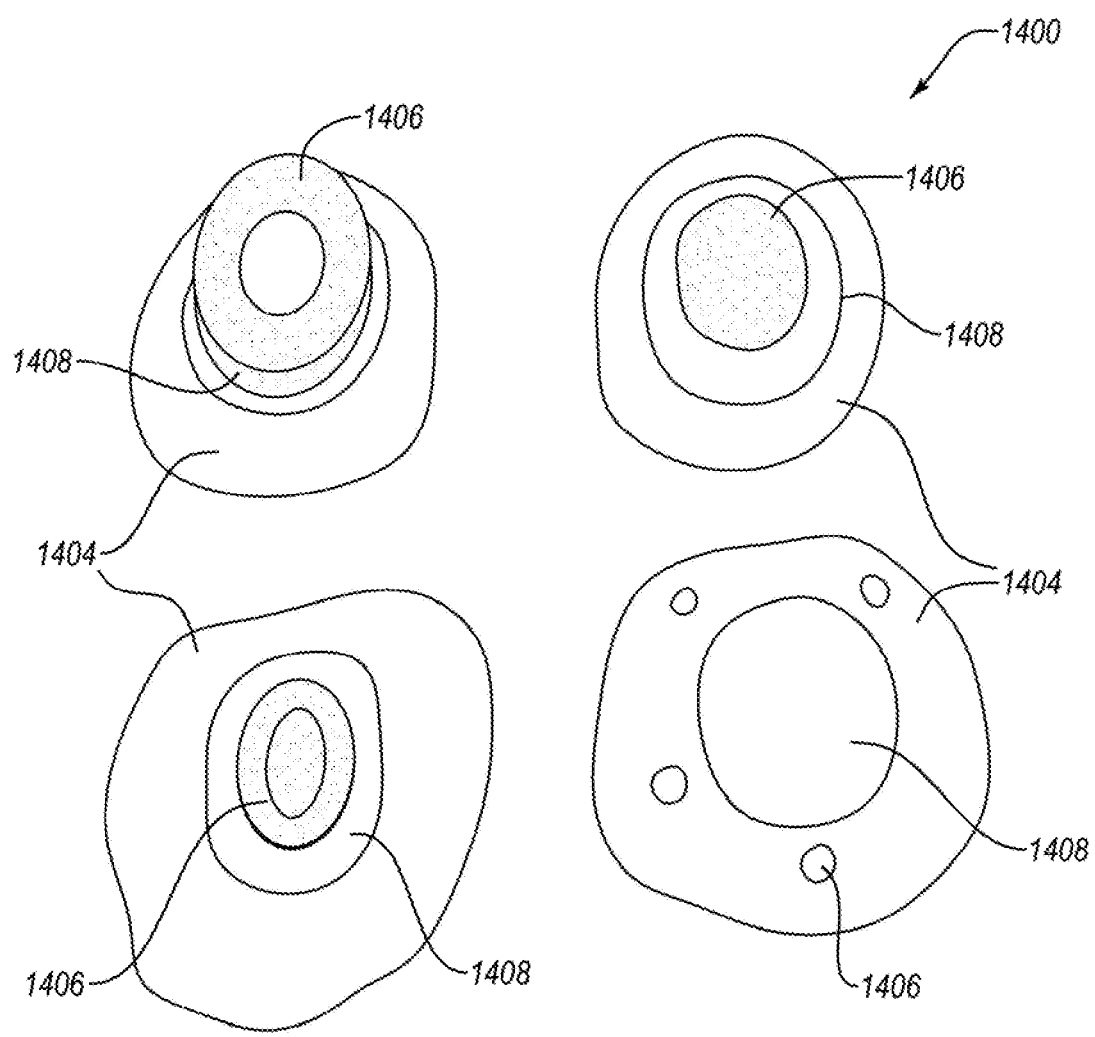
FIG. 14 illustrates a magnetic attachment system for simulant injuries according to an embodiment of the invention.

FIG. 14 illustrates a magnetic attachment system for simulant injuries according to an embodiment of the invention.

Referring to FIG. 14, the wearable injury simulant injury 1400 and attachment mechanism is shown. The simulant injury 1400 includes a first side showing the stimulate injury (not shown) and a second side 1404 having the attachment mechanism configured to be releasably attached to a moulage apparatus as described herein. In this embodiment, the attachment mechanism is one or more magnets 1406 that is attached or attached to a magnet 1408 (not shown) that is embedded into the injury. It is embedded into the injury by having a layer of material covering the magnet 1408. That is, the material may be any material described herein including but not limited to any fabric material or injury material, e.g., rubber or combination. In this embodiment, the attachment mechanism magnet material is sewn inside the simulate injury. Optionally and/or alternatively, the magnet material may be adhered with adhesive or sewn to an outside of the injury.

In embodiments herein, the magnet 1406 attaches to other magnet 1408 (not shown) embedded in the injury. That is, the magnet 1406 and 1408 are strong enough to attach through any fabric described herein. Optionally, only one magnet and the embedded magnet may be a metal material that attracts to the magnet rather than using two magnets. Optionally and/or alternatively, any simulant injury herein can be attached to a user or moulage apparatus with an adhesive material, e.g., double sided tape.

EXAMPLE SECTION

The following examples of moulage training apparats are intended to be illustrative only and are not intended to limit the scope of the invention to only the constructions described by these examples.

Example 1

Figure 15:
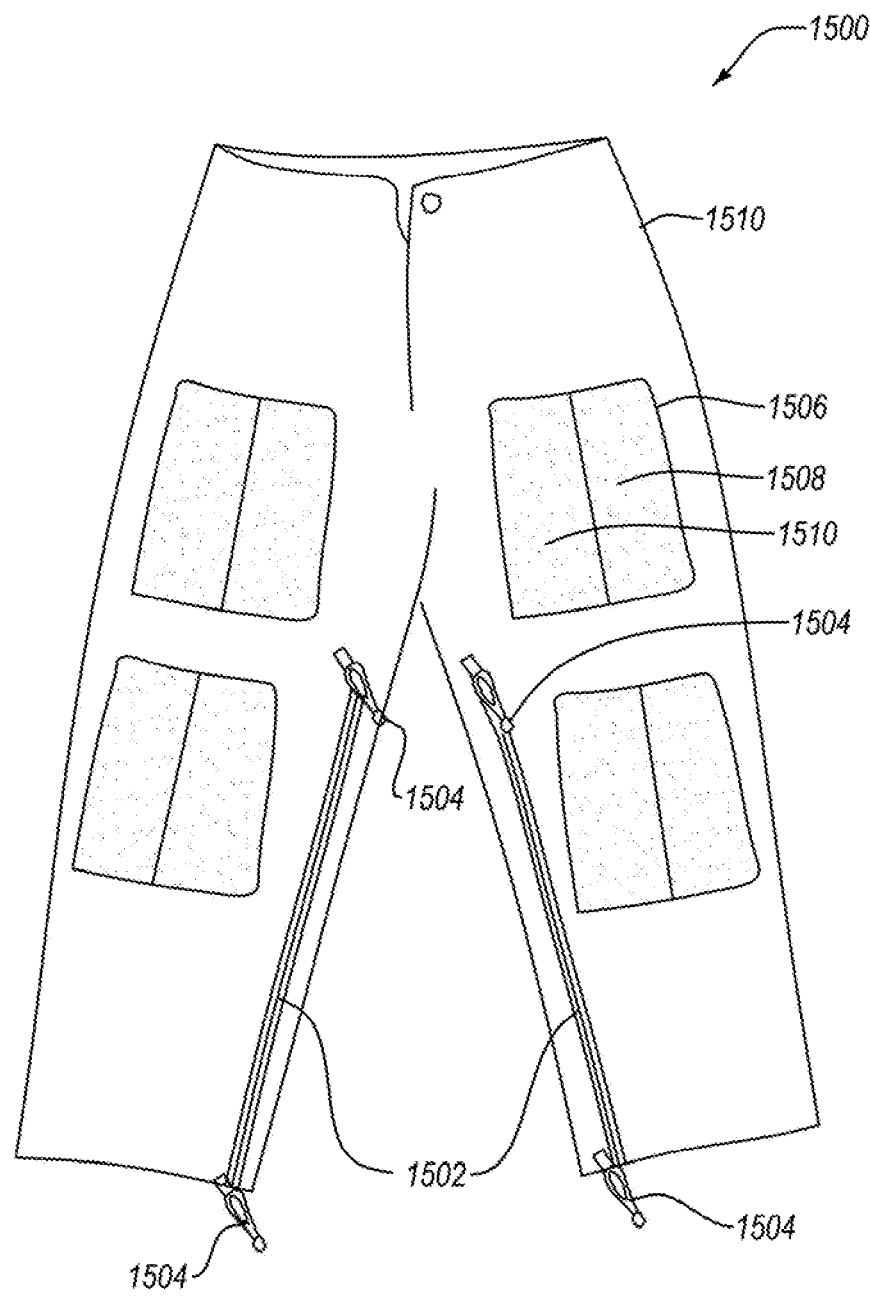
FIG. 15 illustrates a front view of an example of a moulage training bottoms or pants without access panels attached.
Figure 16:
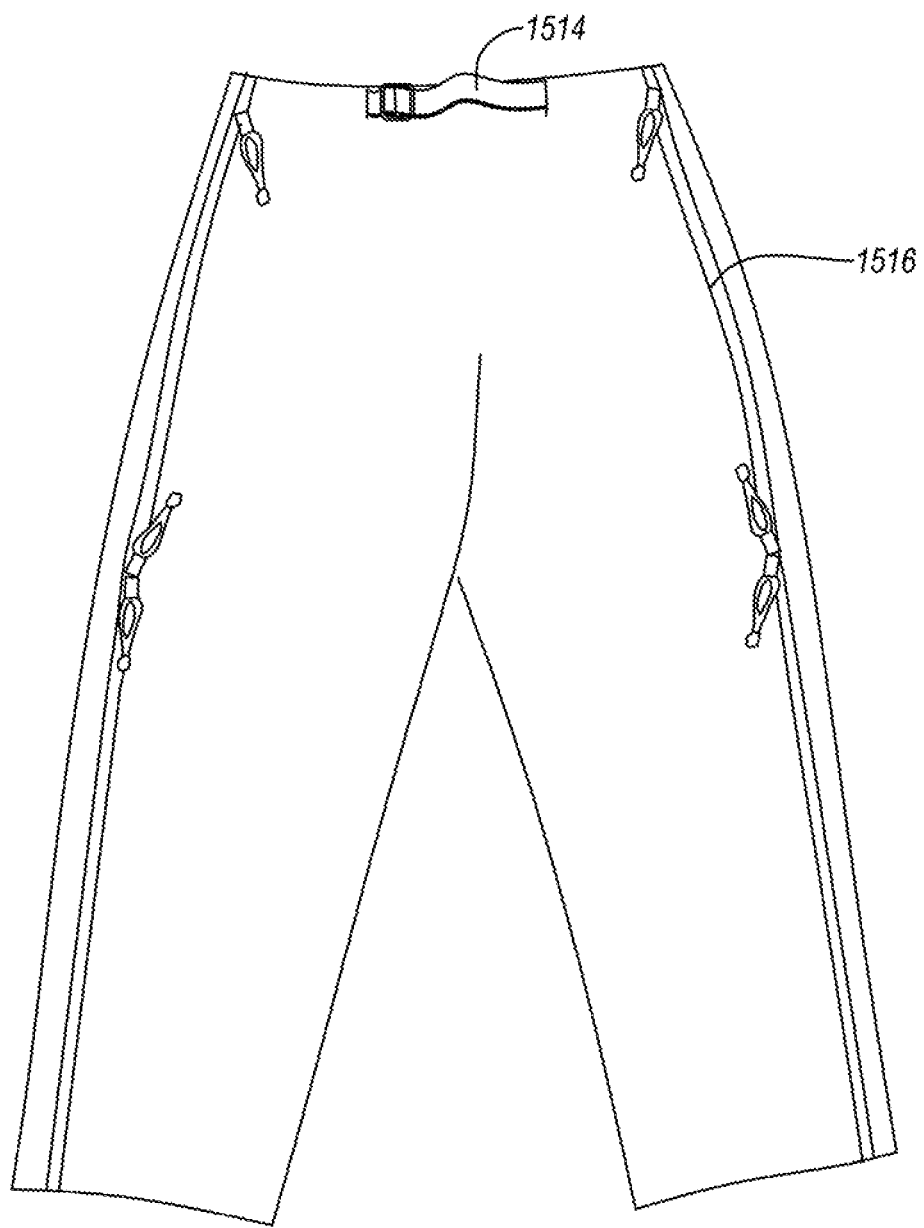
FIG. 16 illustrates a back view of the moulage training bottoms or pants of FIG. 15.
Figure 17:
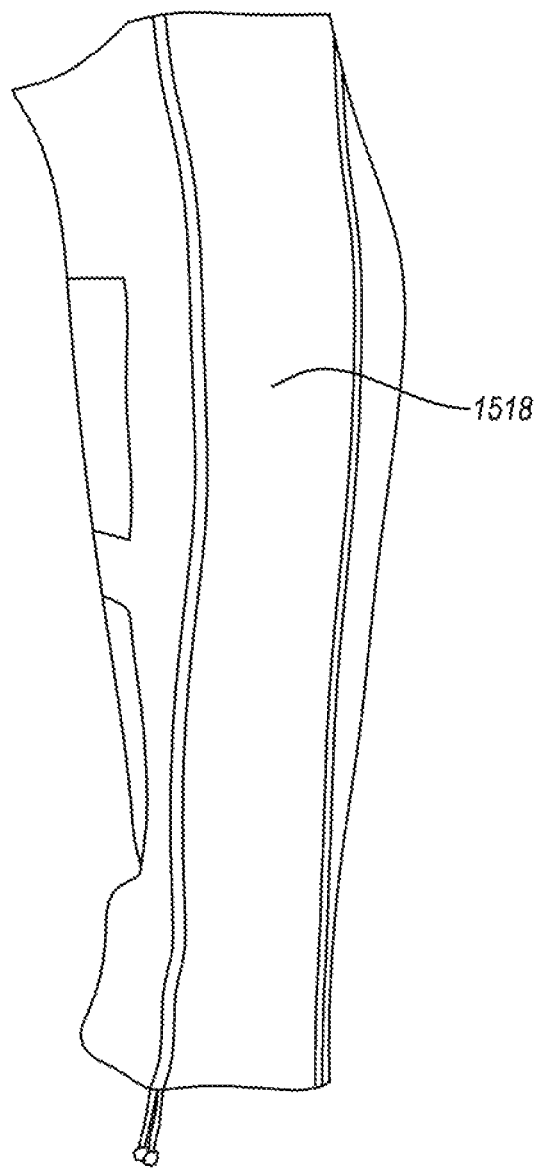
FIG. 17 illustrates a side view of the moulage training bottoms or pants of FIG. 15 in an expanded configuration.
Figure 18:
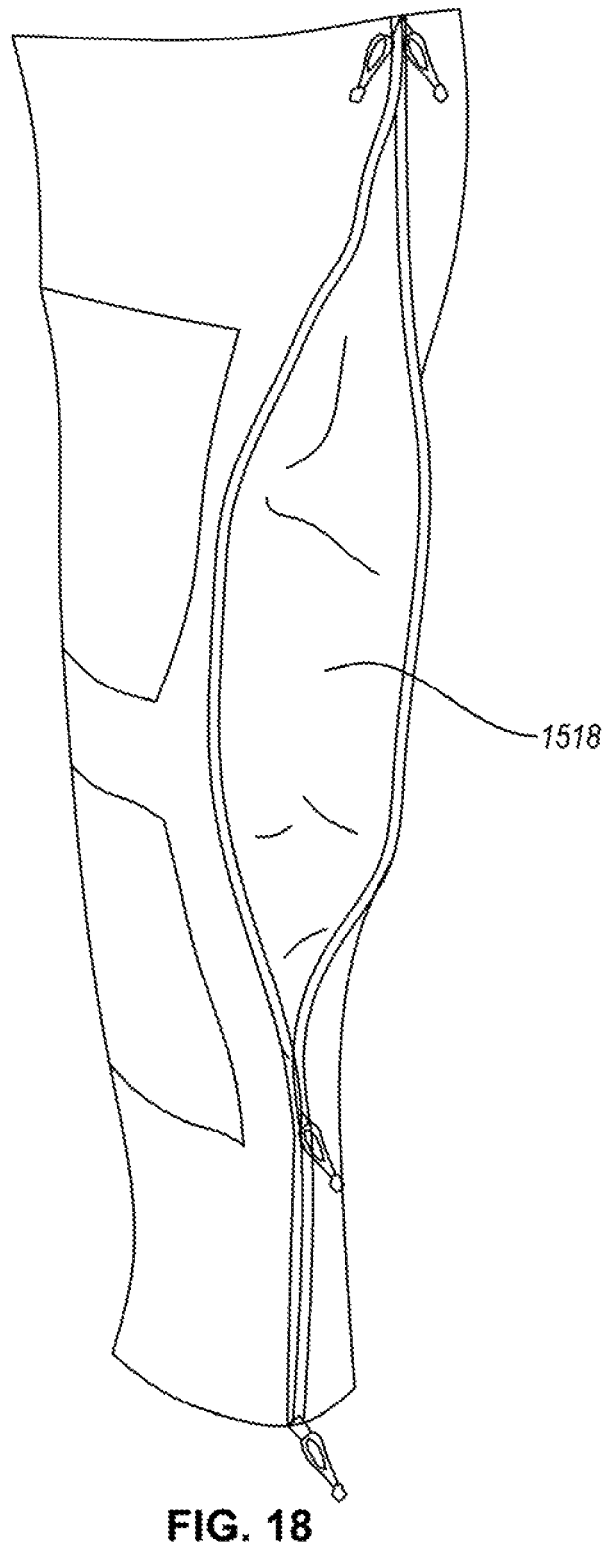
FIG. 18 illustrates a side view of the moulage training bottoms or pants of FIG. 15 in a partially expanded configuration.
Figure 19:
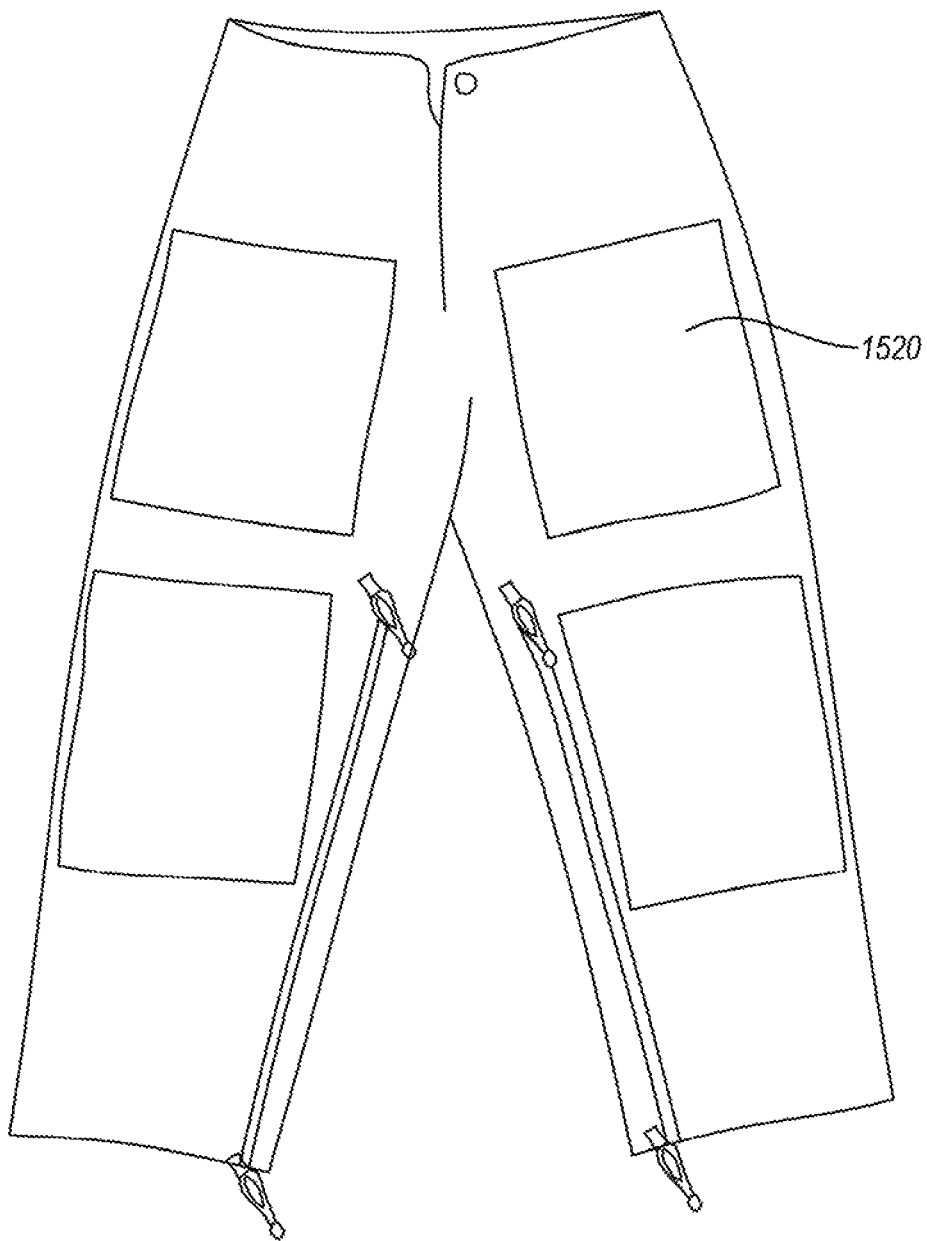
FIG. 19 illustrates a front view of an example of a moulage training bottoms or pants of FIG. 15 with access panels attached.
Figure 20:
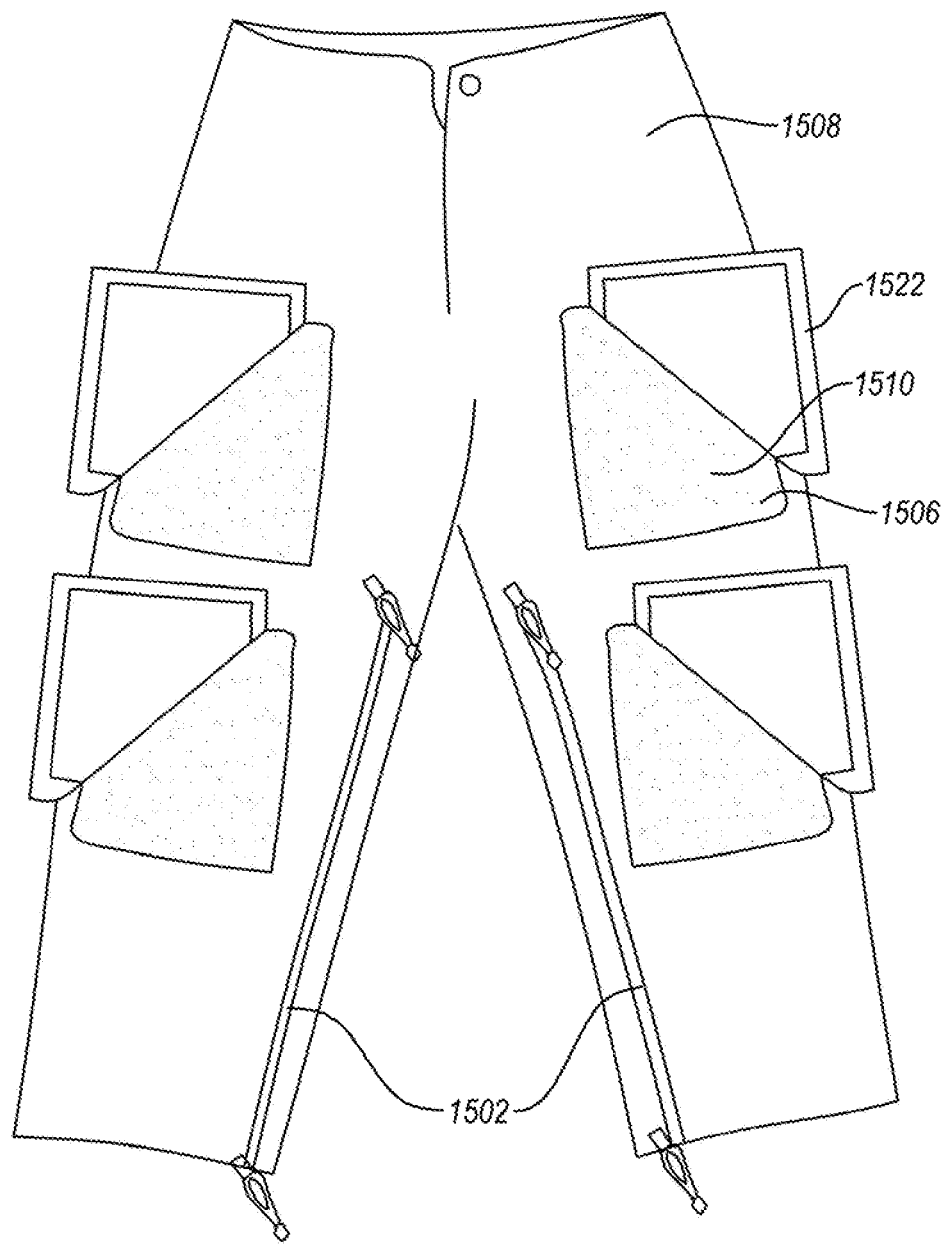
FIG. 20 illustrates a front view of an example of a moulage training bottoms or pants of FIG. 15 with access panels attached in a partially opened configuration.

FIG. 15 illustrates a front view of an example of a moulage training bottoms or pants without access panels attached. FIG. 16 illustrates a back view of the moulage training bottoms or pants of FIG. 15. FIG. 17 illustrates a side view of the moulage training bottoms or pants of FIG. 15 in an expanded configuration. FIG. 18 illustrates a side view of the moulage training bottoms or pants of FIG. 15 in a partially expanded configuration. FIG. 19 illustrates a front view of an example of a moulage training bottoms or pants of FIG. 15 with access panels attached. FIG. 20 illustrates a front view of an example of a moulage training bottoms or pants of FIG. 15 with access panels attached in a partially opened configuration.

Referring to FIGS. 15-20, the moulage training pants 1500 were manufactured. The fabric utilized was a typical military fabric being a mid-weight wicking nylon/cotton ripstop in their branches uniform pattern. The fabric was a light-weight nylon fabric with interwoven ripstop reinforcement threads in a crosshatch pattern configured to offer a favorable strength-to-weight ratio and that small tears cannot easily spread. Fibers used to make ripstop include cotton, silk, polyester, and polypropylene, with nylon content limited to the crosshatched threads that make it tear-resistant.

More specifically, in this example, the fabric used was a 500 denier polyurethane coated nylon fabric including a Cordura weave. The fabric was tan in color. It offers and excellent resistance to fading, abrasion, rot and mildew. It is quick drying, and highly water repellent.

The moulage training apparatus pants 500 were made from wide fabric rolls that were cut into template sections including left leg front, left leg rear, left leg expansion panel, right leg front, right leg rear, right leg expansion panel, and waistband. The sections were sewn together and joined together by seven (7) zippers described in the illustration and sections of fabric sewn directly together in the groin area, buttocks and waistband.

The zipper 1502 joins together the lower section of the pants from the inner knee to the ankle when closed or separated when open. The zipper is a YKK Vision #5 two-way separating zipper made with Delrin plastic teeth or a polyacetal resin molded to the fabric tape edges. The zipper shown here on a standard length training pants is about 22 inches long and allows users to access the pants without removing footwear. It is capable of being opened from the top or bottom to allow access to the user directly and separated completely.

The zipper 1502 includes pullcords 1504 to ease user interaction with the item described in 1502. These pull cords 1504 come in two options and ach uses a Type III Nylon 550 Paracord. They may be attached to the zippers with an 8 inch length with a knot once ran through zipper ends producing a 2 inch cord for user use. Cords shown currently are a 4-inch length with a Plastic nylon cord end produced by YKK for use with a 3-4 mm diameter synthetic cord having inner core for double cord application to result in two-inch pull cords when clasped shut.

The attachment mechanism 1506 is a loop material of a hook-and-loop mechanism that is a Velcro brand #1100 which is a nylon based material sewn to the uniform to create a receptacle area for simulated injuries and removable panels. In this example, a first 4 inch by 10 inch loop material 1508 was joined to a second 4 inch by 10 inch loop material to make an 8 inch by 10 inch attachment mechanism 1506 that was attached to each leg of the directly by sewing a stitch around the edges. This was repeated with an attachment mechanism on each thigh of each leg and below each thigh of each leg as shown.

The fly 1510 include a medium weight YKK #5 separating zippers featuring brass teeth and self-locking sliders is used. This closes the fly 1510 together and helps with access into the uniform. A heavy duty ¾ inch plastic button 1512 was used to complete the closure of the waistband. It was sewn to the uniform through four button holes and reinforced stitching to secure it in place.

A closing mechanism 1514 includes a one-inch webbing cinch strap utilizing d-rings to adjust the fit for smaller individuals. On one side is 4 inch section of webbing ran through two D-rings and sewn back on itself to the waistband producing a two inch section securing the D-rings. On the other side is and 11 inch section of webbing sewn to the uniform which can then be weaved through the one inch plastic rings to pull the left and right sections of fabric closer together to decrease the size of the waistline.

A zipper 1516 joins together the upper section of the pants, connecting the front and back by sewing the zipper to the left and right side of the expansion panel integrated. Sewn from outer waist to the outer knee it helps conceal an expansion panel 1518 additional of about 7 inches of fabric when closed or releases it when the uniforms size is needed to be adjusted larger. The zipper 1516 is a YKK Vislon #5 two-way separating zipper made with Delrin plastic teeth or a polyacetal resin molded to the fabric tape edges. The zipper shown here on a standard length training pants is 20 inches long and allows users to access the pants easier when opened or used for a custom fit on the legs. It is capable of being opened from the top or bottom to expand for the user or separated completely and making a tubular leg with the exposed fabric section. This is repeated on the second leg.

The zipper 1516 joins together the lower section of the pants, connecting the front and back by sewing the zipper to the left and right side of the expansion panel 1518 integrated. Sewn from outer knee to the outer ankle it helps conceal the additional 7 inches of fabric when closed or releases it when the uniforms size is needed to be adjusted larger. It is a YKK Vislon #5 two-way separating zipper made with Delrin plastic teeth or a polyacetal resin molded to the fabric tape edges. The zipper shown here on a standard length training pants is 22 inches long and allows users to access the pants easier when opened or used for a custom fit on the legs. It is capable of being opened from the top or bottom to expand for the user. The zipper 1516 include the pulls strings described herein.

Access panels 1520 were made from the same material as the base fabric to give a continuous appearance. The access panels are 8 inches by ten inches and have corresponding hook-and-loop material 1522 as the attachment mechanism 1506 to allow them to be releasably attached to the attachment mechanism 1506. These access panels 1520 are secured to the uniforms using a Velcro brand hook Nylon Hook 88 material 1522 that is cut to a ⅝-inch width and sewn to the inside surface of the access panels 1520 panels using a linear stitching pattern on each edge of the Velcro all the way around. This is repeated for all the access on the leg.

These removable panels are secured to the uniforms using a Velcro brand hook Nylon Hook 88 fasteners in a ⅝-inch width sewn to the fabric panels using a linear stitching pattern on each edge of the Velcro all the way around.

Example 2

Figure 21:
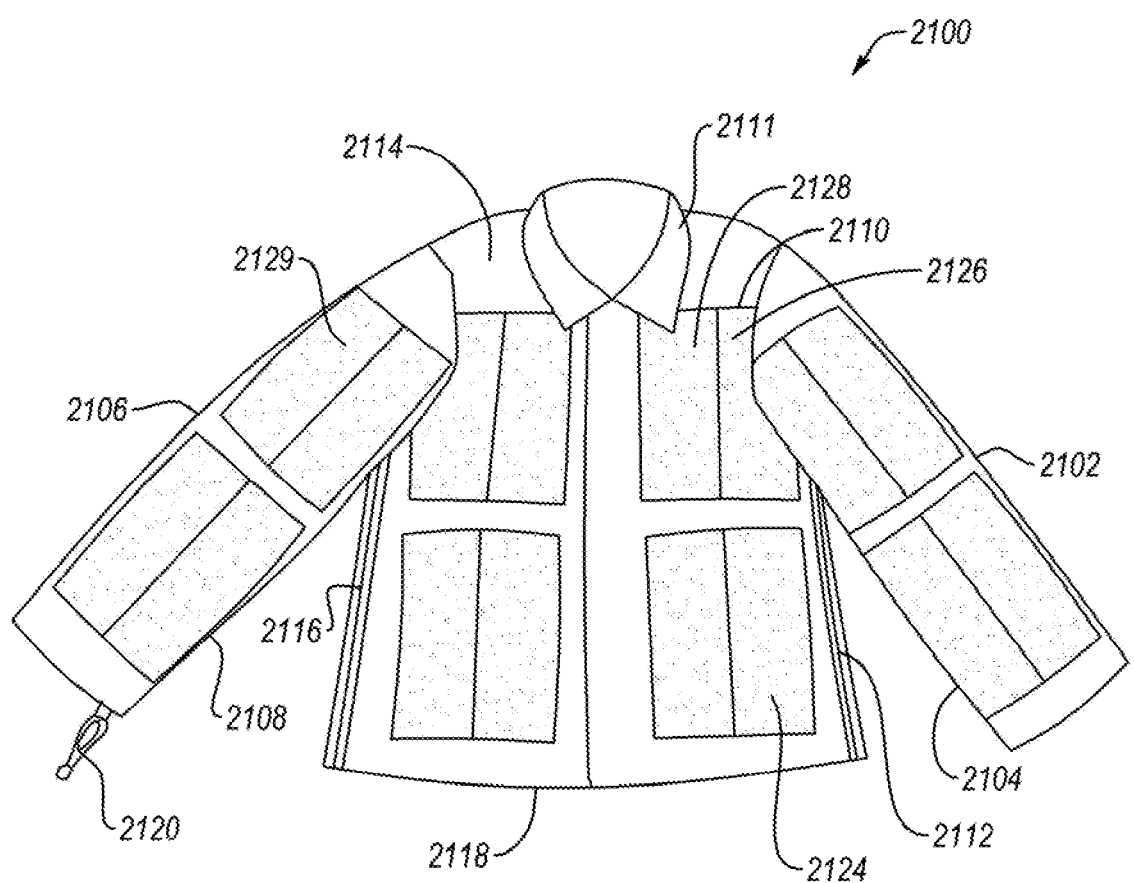
FIG. 21 illustrates a front view of an example of a moulage training top without access panels attached.
Figure 22:
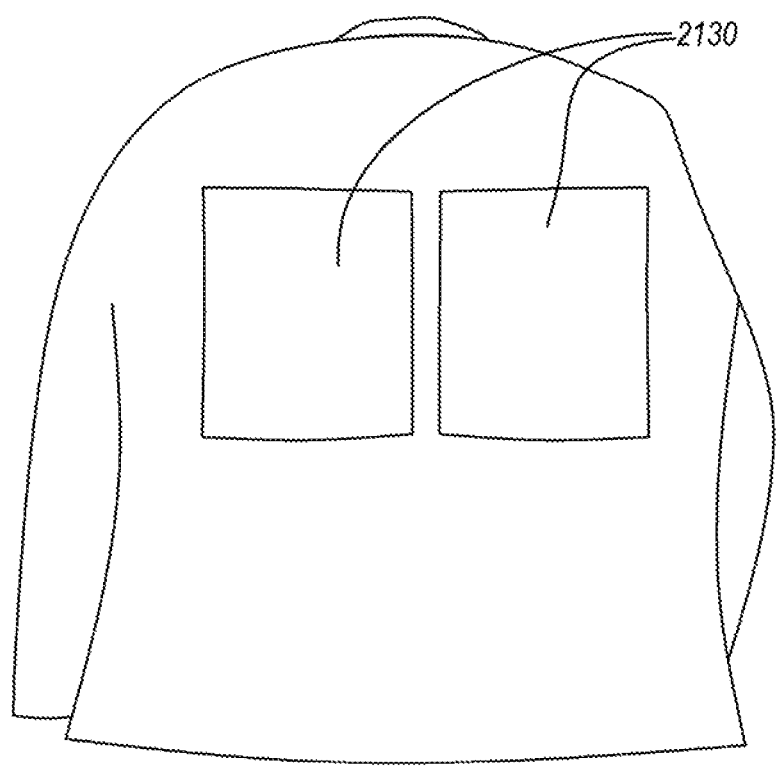
FIG. 22 illustrates a back view of the moulage training top of FIG. 21 with access panels attached.
Figure 23:
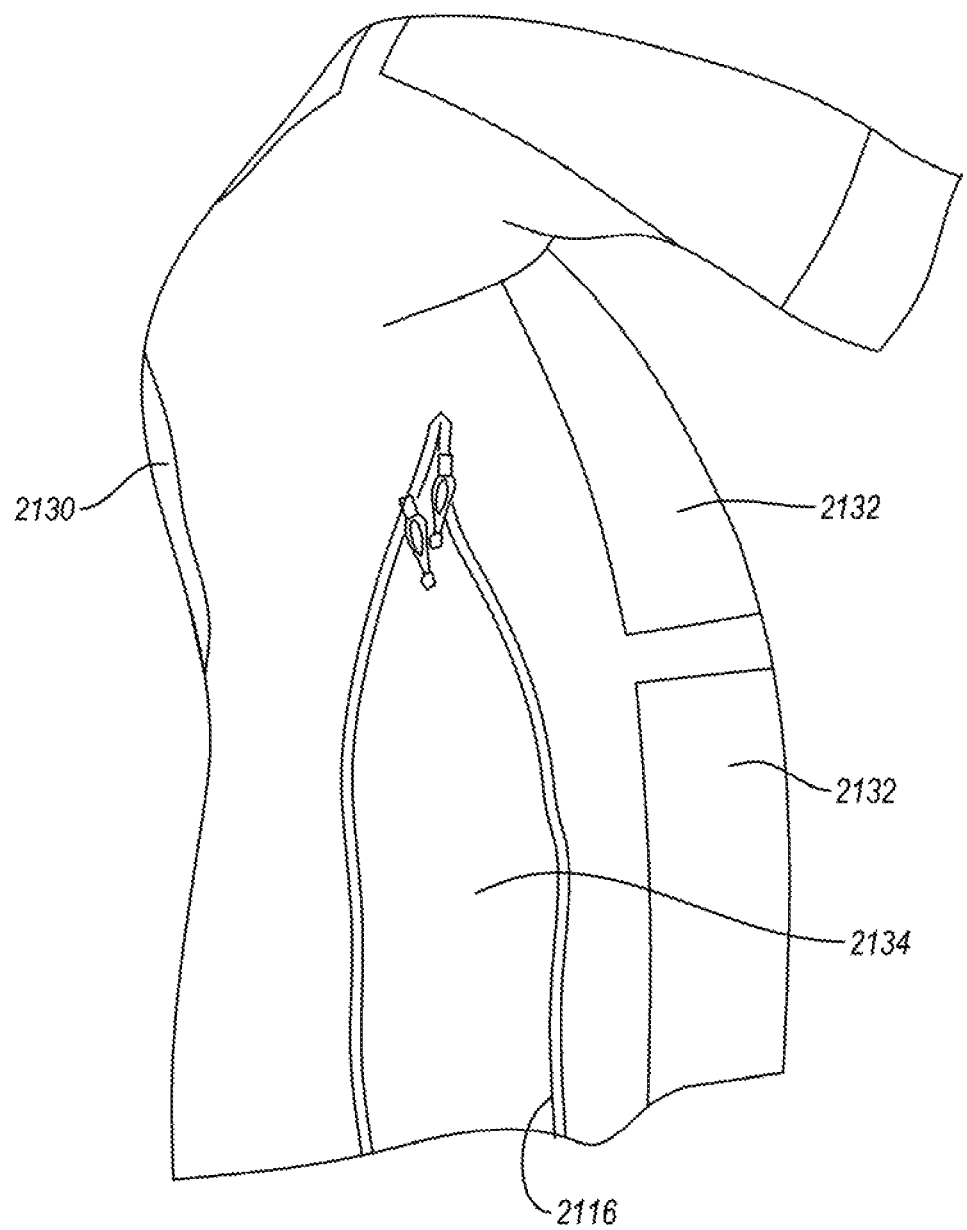
FIG. 23 illustrates a side view of the moulage training top of FIG. 21 in an expanded configuration.
Figure 24:
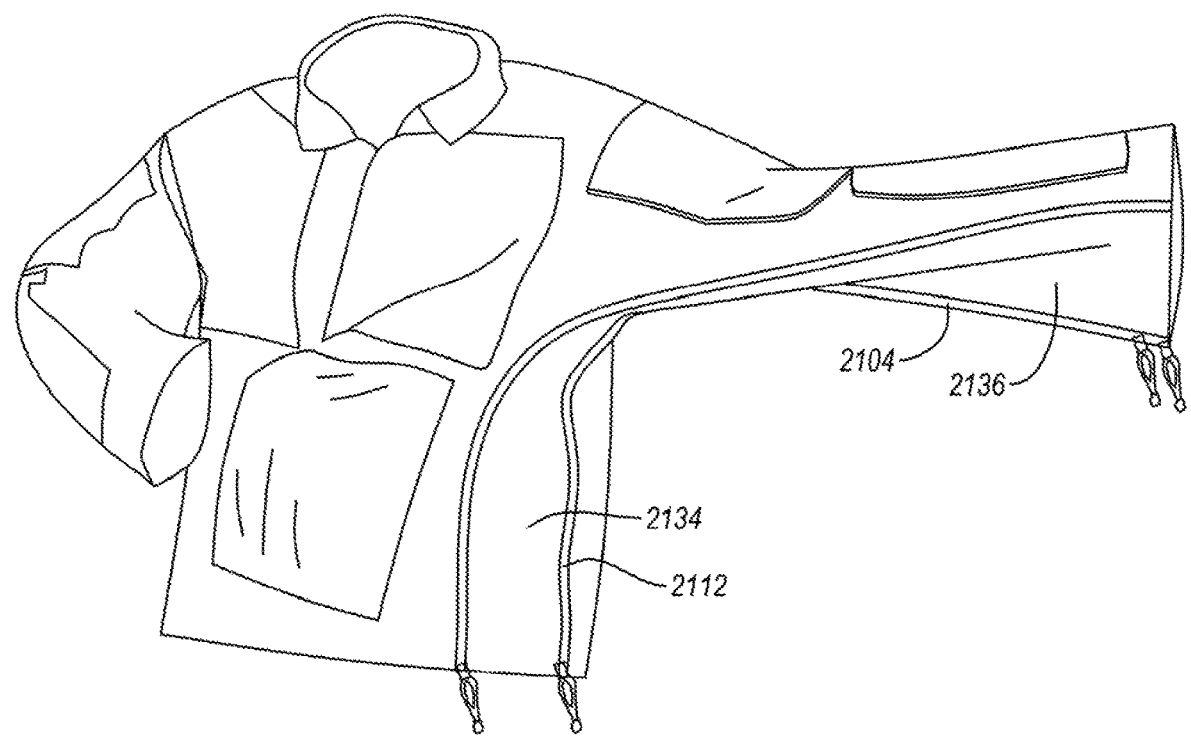
FIG. 24 illustrates a side view of the moulage training top of FIG. 21 in a partially expanded configuration.
Figure 25:
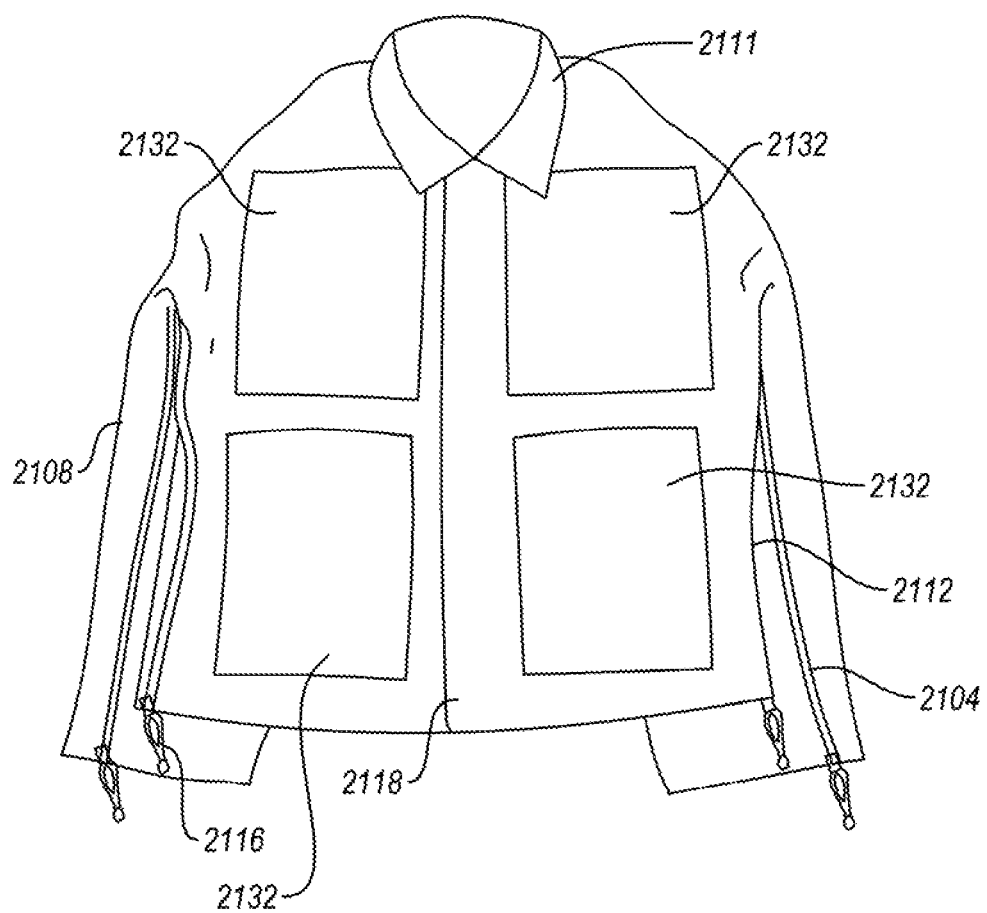
FIG. 25 illustrates a front view of an example of a moulage training top of FIG. 21 with access panels attached.
Figure 26:
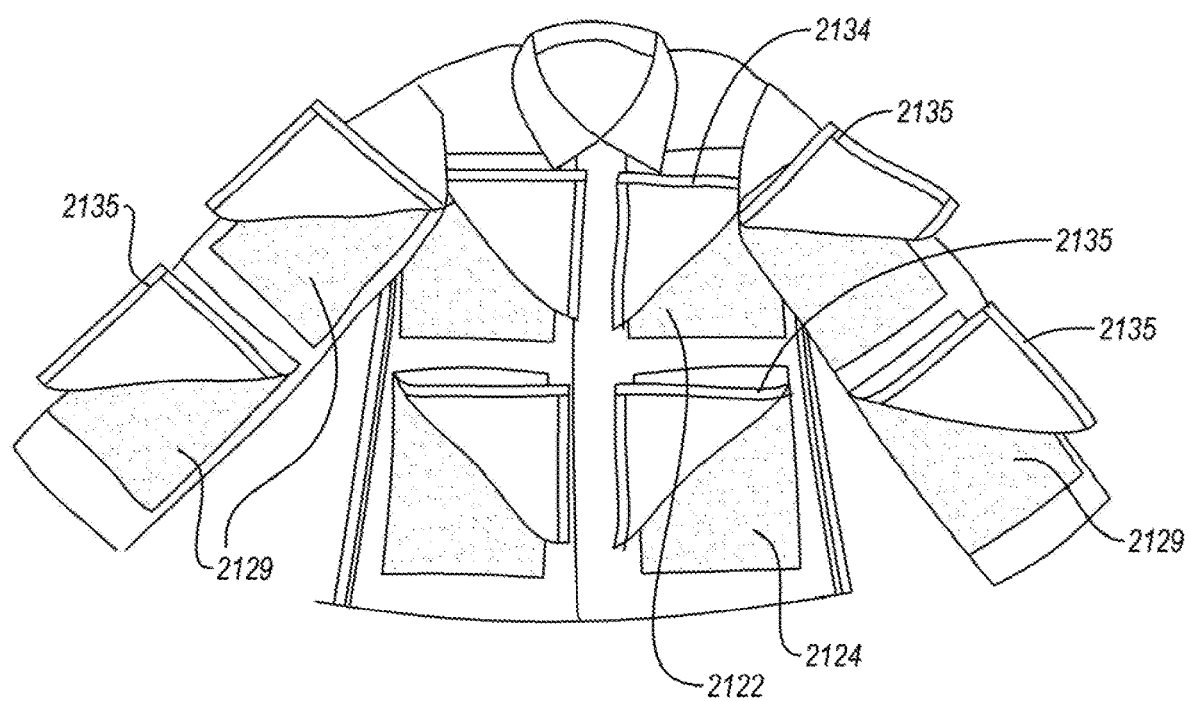
FIG. 26 illustrates a front view of an example of a moulage training top of FIG. 21 with access panels attached in a partially opened configuration.

FIG. 21 illustrates a front view of an example of a moulage training top without access panels attached. FIG. 22 illustrates a back view of the moulage training top of FIG. 21 with access panels attached. FIG. 23 illustrates a side view of the moulage training top of FIG. 21 in an expanded configuration. FIG. 24 illustrates a side view of the moulage training top of FIG. 21 in a partially expanded configuration. FIG. 25 illustrates a front view of an example of a moulage training top of FIG. 21 with access panels attached. FIG. 26 illustrates a front view of an example of a moulage training top of FIG. 21 with access panels attached in a partially opened configuration.

Referring to FIGS. 21-26, the moulage training top 2100 the fabric utilized was a typical military fabric being a mid-weight wicking nylon/cotton ripstop in their branches uniform pattern. The fabric was a light-weight nylon fabric with interwoven ripstop reinforcement threads in a crosshatch pattern configured to offer a favorable strength-to-weight ratio and that small tears cannot easily spread. Fibers used to make ripstop include cotton, silk, polyester, and polypropylene, with nylon content limited to the crosshatched threads that make it tear-resistant.

More specifically, in this example, the fabric used was a 500 denier polyurethane coated nylon fabric including a Cordura weave. The fabric was tan in color. It offers and excellent resistance to fading, abrasion, rot and mildew. It is quick drying, and highly water repellent.

The moulage training apparatus top 2100 was made from wide fabric rolls that were cut into template sections including left torso front, left torso rear, left arm top, left arm bottom, left torso/arm expansion panel, center torso back, right torso front, right torso rear, right arm top, right arm bottom, right torso/arm expansion panel, sleeve adjusters and collar. They were joined together by five (5) zippers. A first sleeve 2102 includes a first zipper 2104 and a second sleeve 2106 includes a second zipper 2108 extending from an armpit region to a wrist region. The first torso region 2110 includes a third zipper 2112 and the second torso region 2114 includes a fourth zipper 2116. The four zippers are sewn to the fabric directly together attaching the sleeves to themselves and the torso, the three back sections and the collar 2111. Additionally, the top 2100 includes on the wrist one button for closure and two holes to reduce the size of the opening. The fifth zipper 2118 is a closure for the first torso region 2110 and second torso region 2114. Each of the zippers are a YKK Vision #5 two-way separating zipper made with Delrin plastic teeth or a polyacetal resin molded to the fabric tape edges.

Each of the five zippers include pullcords 2120 to ease user interaction with the zipper. These pull cords 2120 are a Type III Nylon 550 Paracord. They are attached to each of the zipper with an 8 inch length with a knot once ran through zipper ends producing a 2 inch cord for user use. Cords shown currently are a 4-inch length with a Plastic nylon cord end produced by YKK for use with a 3-4 mm diameter synthetic cord having inner core for double cord application to result in two-inch pull cords when clasped shut.

The first torso region 2110 includes a first attachment mechanism 2122 and second attachment mechanism 2124 identical to the first attachment mechanism 2122. The attachment mechanisms 2122, 2124 include a loop material of a hook-and-loop mechanism that is a Velcro brand #1100 which is a nylon based material sewn to the uniform to create a receptacle area for simulated injuries and removable panels.

In this example, each attachment mechanism 2122 and 2124 include a first 4 inch by 10 inch loop material 2126 joined to a second 4 inch by 10 inch loop material 2128 to make an 8 inch by 10 inch attachment mechanisms 2122 and 2124 that was attached to each torso region directly by sewing a stitch around the edges. This was repeated with an attachment mechanism on each thigh of each leg and below each thigh of each leg as shown. Each arm also includes attachment mechanisms 2129 similar to the 2122 and 2124 as described and attached herein. Moreover, the back of each torso includes two attachment mechanisms (not shown or covered) described and attached herein and access panels 2130 covering attachment mechanism.

Referring to FIGS. 23-24, an expandable material 2136 and 2134 was sewn between the zippers 2104 and 2112 to join the sleeve and torso, respectively. The expandable material 2136 is sewn from the armpit area to the wrist it helps conceal the additional 6 inches of fabric when closed or releases it when the uniforms size is needed to be adjusted larger. A YKK Vision #5 two-way separating zipper 2104 made with Delrin plastic teeth or a polyacetal resin molded to the fabric tape edges. The zipper 2104 shown here on a standard length training top is 20 inches long and allows users to a custom fit on the torso. It is capable of being opened from the top or bottom to expand for the user or separated completely and making a tubular torso area with the exposed fabric section.

The expandable material 2134 is sewn from the armpit area to the waist it helps conceal the additional 6 inches of fabric when closed or releases it when the uniforms size is needed to be adjusted larger. A YKK Vision #5 two-way separating zipper 2112 was made with Delrin plastic teeth or a polyacetal resin molded to the fabric tape edges. The zipper shown here on a standard length training and allows users to a custom fit on the torso. It is capable of being opened from the top or bottom to expand for the user or separated completely and making a tubular torso area with the exposed fabric section. This process was repeated on the other sleeve and torso section to form expandable panels on that section.

Access panels 2130 and 2132 were made from the same material as the base fabric to give a continuous appearance. The access panels are 8 inches by ten inches and have corresponding hook-and-loop material sewn to an inside surface as the attachment mechanism 2135 to allow them to be releasably attached to the attachment mechanism 2126 and 2124. These access panels 2130 and 2132 are secured to the uniforms using a Velcro brand hook Nylon Hook 88 material are cut to a ⅝-inch width and sewn to the inside surface of the access panels 2130 and 2132 panels using a linear stitching pattern on each edge of the Velcro all the way around. This is repeated for all the access on the sleeves and other panels. These removable panels are secured to the uniforms using a Velcro brand hook Nylon Hook 88 fastener 2135 in a ⅝-inch width sewn to the fabric panels using a linear stitching pattern on each edge of the Velcro all the way around.

Example 3

Figure 27:
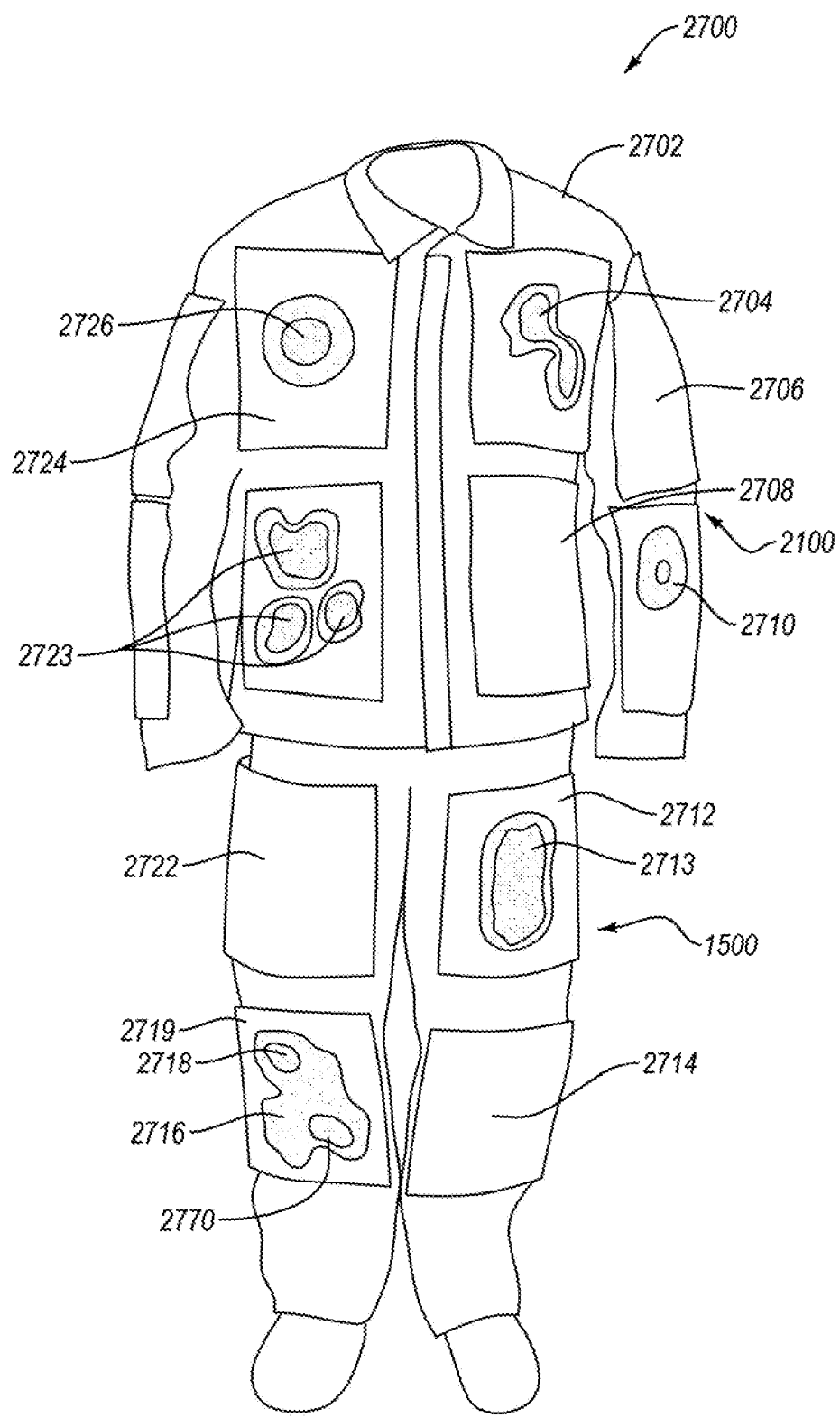
FIG. 27 illustrates a front view of an example of a moulage training top and bottom of FIGS. 15-26 in use.
Figure 28:
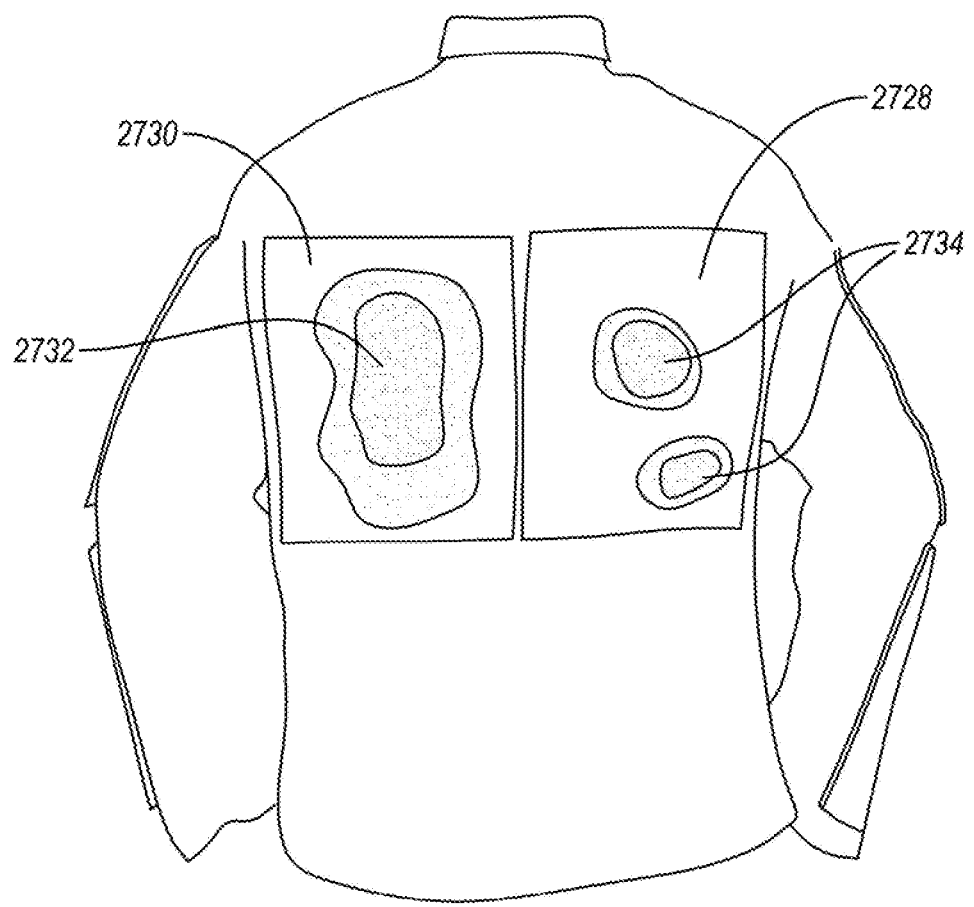
FIG. 28 illustrates a back view of FIG. 27.
Figure 29:
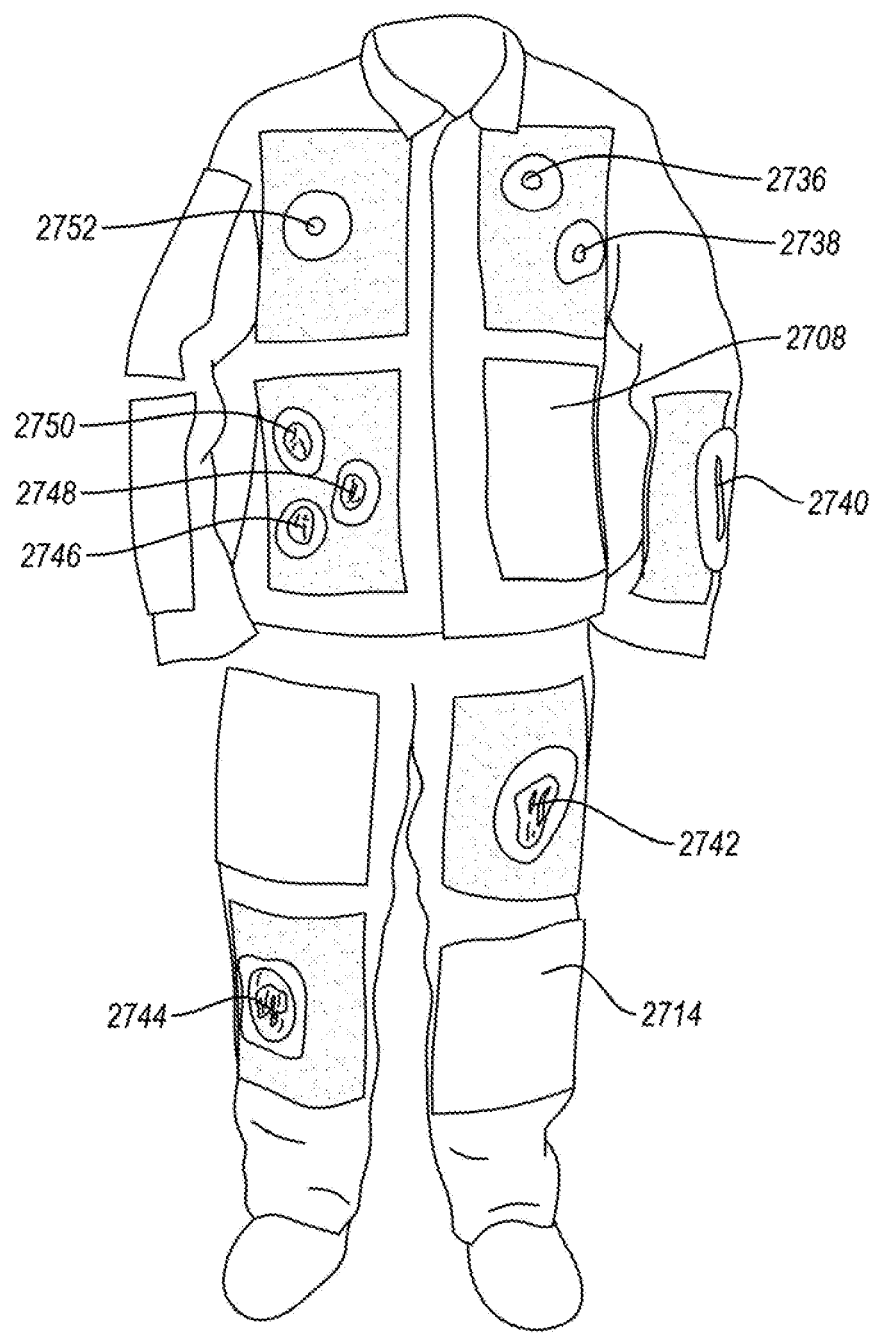
FIG. 29 illustrates a front view of FIG. 27 with access panels in a partially released configuration.

FIG. 27 illustrates a front view of an example of a moulage training top and bottom of FIGS. 15-26 in use. FIG. 28 illustrates a back view of FIG. 27. FIG. 29 illustrates a front view of FIG. 27 with access panels in a partially released configuration.

Referring to FIGS. 27-29, the moulage training apparatus 2700 is shown on a user. The apparatus 2700 was made into a top 2100 and a bottom 1500 as described herein. The apparatus 2700 includes a plurality of access panels including access panel 2702 that is stained with a red fabric color to mimic blood pattern 2704 and a location of an underlying simulant injuries 2736 and 2738. Access panel 2706 is not stained and includes no underlying simulant injuries, size of the injury and type of injury. Access panel 2708 is not stained and includes no underlying simulant injuries. The access panel 2710 is stained with a red fabric color to mimic blood pattern 2710 and a location of an underlying simulant injury 2740, size of the injury and type of injury. The access panel 2712 is stained with a red fabric color to mimic blood pattern 2713 and a location of an underlying simulant injury 2742, size of the injury and type of injury. Access panel 2714 is not stained and includes no underlying simulant injuries.

Access panel 2726 is stained with a red fabric color to mimic blood pattern 272724 and a location of an underlying simulant injury 2752, size of the injury and type of injury. Access panel 2721 is stained with a red fabric color to mimic blood pattern 2723 and a location of an underlying simulant injuries 2750, 2748, and 2746, size of the injury and type of injury. Access panel 2722 is not stained and includes no underlying simulant injuries. Access panel 2719 includes a stained section 2716 with a red fabric color to mimic blood pattern and a location of an underlying simulant injuries 2744, size of the injury and type of injury. Access panel 2719 also includes a hole portion 2718 showing a portion of the underlying simulant injury 2744. Access panel 2719 also includes a burned section 2720. On the back of the uniform, access panels 2728 and 2730 also include blood stains 2734 and 2732 over simulant injures and the stains are sized and at a location of an underlying simulant injuries and configured to mimic the type of injury.

Example 4

Figure 30:
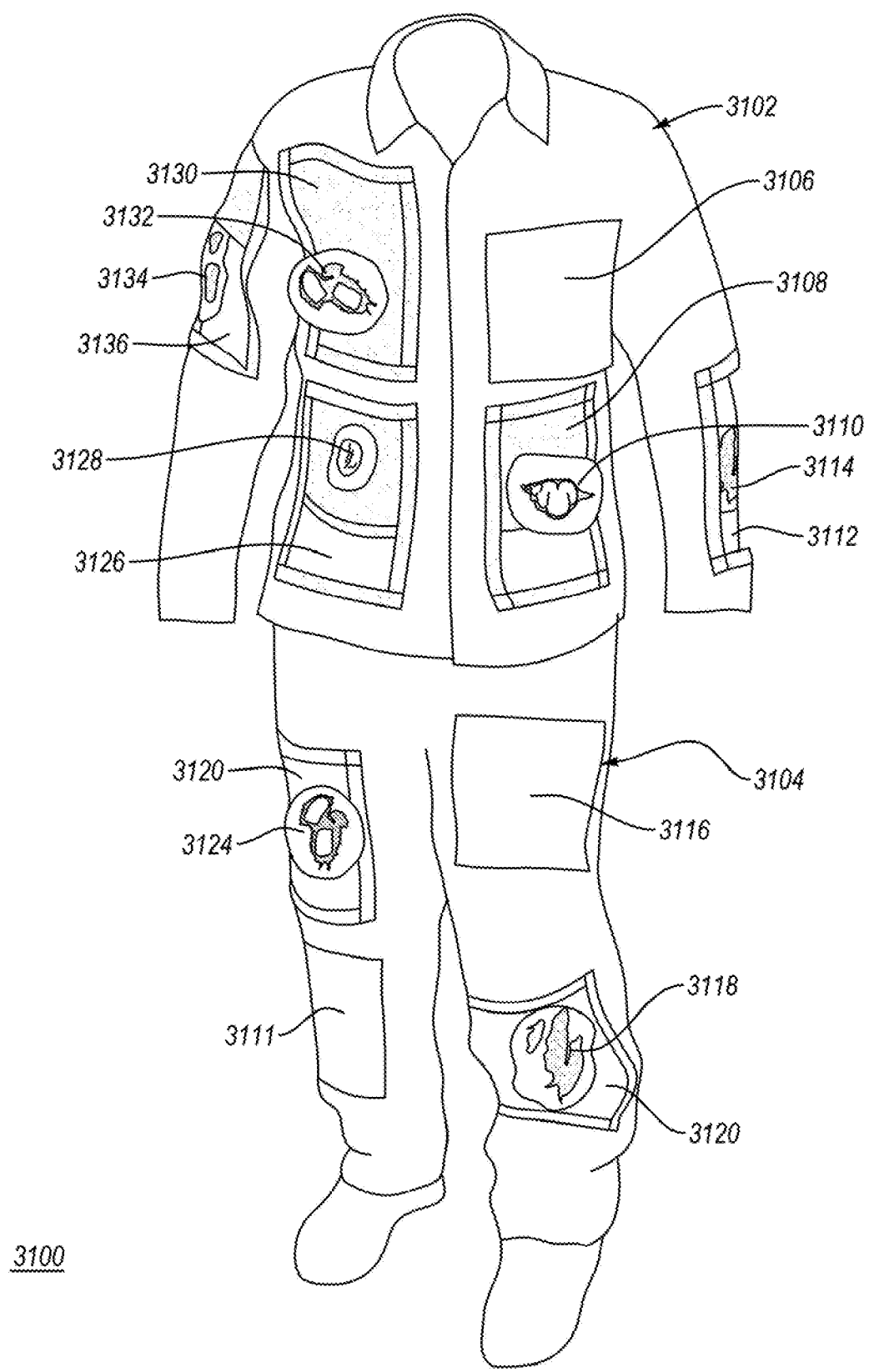
FIG. 30 illustrates a front view of an example of a moulage training top and bottom in use.

FIG. 30 illustrates a front view of an example of a moulage training top and bottom in use.

Referring to FIG. 30, the moulage training apparatus 3100 is shown on a user. The apparatus 3100 was made into a top 3102 and a bottom 3104 as described herein. The apparatus 3100 includes a plurality of access panels as described herein. More specifically, the top 3102 includes an access panel 3106, an access panel removed arranged adjacent to 3106 with a hole or port 3108 in the uniform to expose a simulant injury 3110 attached to an undershirt of the user with a magnetic attachment mechanism described herein, e.g., FIG. 14 and related text.

Access panel 3111 is attached and not removed. The access panel adjacent to panel 3111 is removed with a hole or port 3120 is removed in the uniform to expose a wearable simulant injury 3124 attached to a leg of user with a magnetic attachment mechanism as described with reference to FIG. 14 and other sections herein.

The access panel adjacent to panel 3120 is removed with a hole or port 3126 is removed in the uniform to expose a wearable simulant injury 3128 and attached to a shirt of user with a magnetic attachment mechanism as described with reference to FIG. 14 and other sections herein.

The access panel adjacent to panel 3106 is removed with a hole or port 3130 is removed in the uniform to expose a wearable simulant injury 3134 and attached to a shirt of user with a magnetic attachment mechanism as described with reference to FIG. 14 and other sections herein.

The access panel adjacent on the right arm of the user is removed with a hole or port 3134 is removed in the uniform to expose a wearable simulant injury 3134 and attached to an arm of a user with an adhesive material, e.g., rubber cement, glue, double sided tape or other adhesive material.

The access panel adjacent on the left arm of the user is removed with a hole or port 3112 is removed in the uniform to expose a wearable simulant injury 3114 and attached to an arm of a user with an adhesive material, e.g., rubber cement, glue, double sided tape or other adhesive material.

The particular examples and implementations of the subject matter have been described. As will be apparent to those skilled in the art, other implementations, alterations, and permutations of the particular implementations are considered to be within the scope of the disclosure and the following claims. Features of the various implementations are also combinable. While operations are depicted in the drawings or claims in a particular order, this should not be understood as requiring that such operations be performed in the particular order shown or in sequential order, or that all illustrated operations be performed (some operations may be considered optional), to achieve desirable results.

While this disclosure contains many specific implementation details, these should not be construed as limitations on the scope of any invention or on the scope of what may be claimed, but rather as descriptions of features that may be specific to particular implementations of particular inventions. Certain features that are described in the context of separate implementations can also be implemented, in combination, in a single implementation.

Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Accordingly, the previously described example implementations do not necessarily define or constrain this disclosure. Other changes, substitutions, and alterations are also possible within the scope of this disclosure.

To avoid unnecessarily obscuring the present disclosure, the preceding description may omit a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Also, while the flowcharts have been discussed and illustrated in relation to a particular sequence of events, it should be appreciated that changes, additions, and omissions to this sequence can occur without materially affecting the operation of the disclosed embodiments, configuration, and aspects. A number of variations and modifications of the disclosure can be used. It would be possible to provide for some features of the disclosure without providing others.

Moreover, though the description has included a description of one or more aspects, implementations, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A moulage training system for training aids emergent and non-emergent medical treatment and acute care simulation, comprising:
   one or more injury simulants having a first surface configured to mimic a wound or injury of a user and a second surface having an injury simulant attachment mechanism;
   a moulage training uniform comprising an article of clothing comprising a torso configured as a shirt comprising a torso portion configured to cover a torso of a user, a neck portion extending from the torso portion, a first shoulder portion extending from the neck portion, a second shoulder portion extending from the neck portion, a first sleeve extending from the first shoulder portion configured to receive a first arm of the user, a second sleeve configured to receive a second arm of the user, a closable front opening extending from the neck portion through the torso portion, one or more expandable portions configured to be adjustable for different size users, one or more access panels each including an access panel attachment mechanism, and one or more moulage training uniform attachment mechanisms, wherein one of the one or more moulage training uniform attachment mechanisms is configured to releasably attach to the simulant attachment mechanism;
   wherein the access panel attachment mechanism of each panel is configured to releasably attach to one of the moulage training uniform attachment mechanisms,
   wherein the one or more access panels is sized to substantially cover one of the one or more injury simulants when the one or more injury simulants is attached to the moulage training uniform attachment mechanism, and
   wherein the one or more access panels is configured to be removed or partially removed to allow access to the one or more injury simulants when the one or more injury simulants is attached to the moulage training uniform.

2. The moulage training system of claim 1, wherein one of the access panel attachment mechanisms comprises a portion with a hook-and-loop attachment mechanism arranged around a perimeter region of an inside surface of the one of the access panels.

3. The moulage training system of claim 2, wherein the moulage training uniform further comprising a radio-frequency identification tag or a label attached to the moulage training uniform.

4. The moulage training system of claim 1, wherein the moulage training uniform further comprises a fluid delivery system configured to deliver a fluid.

5. The moulage training system of claim 1, wherein at least one of the one or more access panels comprises a hole or partial hole configured to mimic one or more of a bullet hole, a knife hole, an explosion hole and combinations of the same.

6. The moulage training system of claim 1, wherein at least one of the one or more access panels have one or more of a blast pattern, a fire burn pattern, a chemical burn pattern, and combinations of the same.

7. The moulage training system of claim 1, wherein the injury simulant attachment mechanism comprises a first magnetic coupled to the injury simulant and the second magnetic configured to attach the first magnetic.

8. A moulage training system for training aids emergent and non-emergent medical treatment and acute care simulation, comprising:
- an injury simulant having a first surface configured to mimic a wound of an injury of a user and a second surface having an injury simulant attachment mechanism;
- a moulage training uniform comprising:
  - a body portion configured to cover an upper torso of a user when worn by a user;
  - a neck portion extending from the body portion and configured to receive a neck of the user;
  - a first shoulder portion extending from the neck portion and configured to cover a first shoulder of the user;
  - a second shoulder portion extending from the neck portion configured to cover a second shoulder of the user;
  - a torso portion extending from the first shoulder portion and the second shoulder portion to a waist of the user;
  - a first arm portion extending from the first shoulder portion;
  - a second arm portion extending from the second shoulder portion;
  - a closable portion extending from the neck portion through the torso portion to the waist of the user, wherein the closable portion is substantially centered on the torso portion, and wherein the closable portion includes a closing mechanism associated with the closable portion to maintain the closable portion in an open or closed position;
  - one or more expandable portions configured to adjust for different size users;
  - a first torso access panel including a first torso access panel attachment mechanism arranged on an interior surface of the first torso access panel, the first torso access panel attachment mechanism is configured to releasably attach to a torso attachment mechanism arranged on the torso portion, and
  - wherein the first torso access panel is sized to substantially cover the injury simulant from view when the injury simulant is attached to a portion the moulage training uniform.

9. The moulage training system of claim 8, wherein the moulage training uniform comprises one or more materials comprising one or more of a cloth material, a synthetic material, a polyester material, a wool material, a silk material, a flax material, a jute material, a bamboo material, a glass fiber material, a nylon material, an acrylic material, a rayon material, a polyurethane material, an olefin material, a thermoplastic material, a synthetic fiber material, a composite material, a polytetrafluoroethylene material and combinations of the same.

10. The moulage training system of claim 8, wherein the injury simulant attachment mechanism comprises one or more of a hook-and-loop attachment mechanism and a magnetic attachment mechanism.

11. The moulage training system of claim 8, further comprises a fluid delivery system to deliver a fluid configured to look like blood.

12. The moulage training system of claim 8, wherein the first torso access panel has one or more of a blast pattern, a fire burn pattern, a chemical burn pattern, and combinations of the same.

13. The moulage training system of claim 8, wherein the injury simulant attachment mechanism comprises a first magnetic coupled to the injury simulant and the second magnetic configured to attach the first magnetic.

14. A moulage training system for training aids emergent and non-emergent medical treatment and acute care simulation, comprising:
- one or more injury simulants having a first surface configured to mimic a wound or injury of a user and a second surface having an injury simulant attachment mechanism;
- a moulage training uniform configured to be worn by a person or a mannequin comprising an article of clothing comprising a shirt, wherein the shirt includes a body portion configured to cover a torso region of a user, a first sleeve configured to receive a first arm of the user, a second sleeve configured to receive a second arm of the user, a closable front opening, one or more expandable portions configured to be adjustable for different size users and one or more access panels, and
- at least one moulage training uniform attachment mechanism configured to be attached to an outer surface of the article of clothing and configured to be attached to the injury simulant attachment mechanism,
- wherein the one or more access panels are releasably attached with an access panel attachment mechanism to a moulage training uniform attachment mechanism, and
- wherein one of the one or more access panels is sized and configured to fully cover at least one of the one or more injury simulants from view when the one or more injury stimulants is attached to the moulage training uniform, and configured to be removed or partially removed to allow access to the one or more injury simulants when the one or more injury simulants are attached the moulage training uniform.

15. The moulage training system of claim 14, wherein the one or more access panels has one or more of a blast pattern, a fire burn pattern, a chemical burn pattern, and combinations of the same.

16. The moulage training system of claim 14, wherein the moulage training uniform comprises one or more comprising one or more of a cloth material, a synthetic material, a polyester material, a wool material, a silk material, a flax material, a jute material, a bamboo material, a glass fiber material, a nylon material, an acrylic material, a rayon material, a polyurethane material, an olefin material, a thermoplastic material, a synthetic fiber material, a composite material, a polytetrafluoroethylene material and combinations of the same.

17. The moulage training system of claim 14, wherein the injury simulant attachment mechanism comprises one or more of a hook-and-loop attachment mechanism and a magnetic attachment mechanism.

18. The moulage training system of claim 14, further comprises a fluid delivery system to deliver a fluid configured to look like blood.

19. The moulage training system of claim 14, wherein the one or more access panels comprises a hole or partial hole configured to mimic one or more of a bullet hole, a knife hole, an explosion hole and combinations of the same.

20. The moulage training system of claim 14, wherein the injury simulant attachment mechanism comprises a first magnetic coupled to the injury simulant and the second magnetic configured to attach the first magnetic.

* * * * *